United States Patent
Wang et al.

(10) Patent No.: US 12,245,255 B2
(45) Date of Patent: Mar. 4, 2025

(54) SIDELINK REPEATER CAPABILITY SIGNALING

(71) Applicant: QUALCOMM INCORPORATED, San Diego, CA (US)

(72) Inventors: Xiaojie Wang, Hillsborough, NJ (US); Navid Abedini, Basking Ridge, NJ (US); Jianghong Luo, Skillman, NJ (US); Junyi Li, Fairless Hills, PA (US); Xiaoxia Zhang, San Diego, CA (US); Tao Luo, San Diego, CA (US); Piyush Gupta, Bridgewater, NJ (US)

(73) Assignee: QUALCOMM Incorporated, San Diego, CA (US)

(*) Notice: Subject to any disclaimer, the term of this patent is extended or adjusted under 35 U.S.C. 154(b) by 331 days.

(21) Appl. No.: 17/530,229

(22) Filed: Nov. 18, 2021

(65) Prior Publication Data
US 2023/0156751 A1    May 18, 2023

(51) Int. Cl.
*H04W 72/51* (2023.01)
*H04W 16/28* (2009.01)
*H04W 72/02* (2009.01)
*H04W 72/044* (2023.01)
*H04W 92/18* (2009.01)

(52) U.S. Cl.
CPC .......... *H04W 72/51* (2023.01); *H04W 16/28* (2013.01); *H04W 72/02* (2013.01); *H04W 72/046* (2013.01); *H04W 92/18* (2013.01)

(58) Field of Classification Search
CPC ..... H04W 72/51; H04W 16/28; H04W 72/02; H04W 72/046; H04W 92/18
See application file for complete search history.

(56) References Cited

U.S. PATENT DOCUMENTS

| | | | |
|---|---|---|---|
| 2018/0054237 A1* | 2/2018 | Tseng | H04W 36/0022 |
| 2019/0357025 A1* | 11/2019 | Hwang | H04W 8/24 |
| 2020/0092685 A1* | 3/2020 | Fehrenbach | H04W 84/005 |
| 2021/0037528 A1* | 2/2021 | Nam | H04W 72/0466 |
| 2021/0160956 A1* | 5/2021 | Wang | H04W 40/34 |
| 2021/0160957 A1* | 5/2021 | Wang | H04W 40/22 |
| 2021/0409937 A1* | 12/2021 | Kuo | H04W 40/12 |
| 2022/0217612 A1* | 7/2022 | Wang | H04W 28/0883 |
| 2022/0295375 A1* | 9/2022 | Wang | H04W 76/14 |
| 2022/0303749 A1* | 9/2022 | Wu | H04W 24/08 |
| 2022/0338092 A1* | 10/2022 | Wang | H04W 72/02 |
| 2022/0338283 A1* | 10/2022 | Wang | H04W 76/14 |
| 2022/0369186 A1* | 11/2022 | Diao | H04W 40/248 |

* cited by examiner

*Primary Examiner* — Ajay Cattungal
(74) *Attorney, Agent, or Firm* — Haynes and Boone, LLP

(57) ABSTRACT

According to one aspect of the present disclosure, a method of wireless communication performed by a first wireless communication device includes: initiating a registration protocol for performing repeater operations for sidelink communications; transmitting, to a second wireless communication device, a sidelink capability report indicating sidelink repeating capabilities of the first wireless communication device; receiving a sidelink repeating configuration based on the sidelink capability report; and communicating a first signal based on the sidelink repeating configuration.

30 Claims, 11 Drawing Sheets

SIDELINK REPEATER CAPABILITY SIGNALING

TECHNICAL FIELD

This application relates to wireless communication systems, and more particularly to sidelink communication systems and networks including wireless repeaters or relay devices.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands. Sidelink communications may be used in industrial internet-of-things (IIOT) scenarios, for example.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect of the present disclosure, a method of wireless communication performed by a first wireless communication device includes: initiating a registration protocol for performing repeater operations for sidelink communications; transmitting, to a second wireless communication device, a sidelink capability report indicating sidelink repeating capabilities of the first wireless communication device; receiving a sidelink repeating configuration based on the sidelink capability report; and communicating a first signal based on the sidelink repeating configuration.

According to another aspect of the present disclosure, a method of wireless communication performed by a first wireless communication device includes: receiving, from a second wireless communication device, a connection request; receiving, from the second wireless communication device, a sidelink capability report indicating sidelink repeating capabilities of the second wireless communication device; and transmitting, based on the sidelink capability report, a sidelink repeating configuration.

According to another aspect of the present disclosure, a first wireless communication device includes: a processor and a transceiver in communication with the processor, wherein the processor and the transceiver are configured to: initiate a registration protocol for performing repeater operations for sidelink communications; transmit, to a second wireless communication device, a sidelink capability report indicating sidelink repeating capabilities of the first wireless communication device; receive a sidelink repeating configuration based on the sidelink capability report; and communicate a first signal based on the sidelink repeating configuration.

According to another aspect of the present disclosure, a first wireless communication device includes: a processor and a transceiver in communication with the processor, wherein the processor and the transceiver are configured to: receive, from a second wireless communication device, a connection request; receive, from the second wireless communication device, a sidelink capability report indicating sidelink repeating capabilities of the second wireless communication device; and transmit, based on the sidelink capability report, a sidelink repeating configuration.

According to another aspect of the present disclosure, a non-transitory computer-readable medium comprises program code recorded thereon. The program code comprises instructions executable by a processor to cause a first wireless communication device to: initiate a registration protocol for performing repeater operations for sidelink communications; transmit, to a second wireless communication device, a sidelink capability report indicating sidelink repeating capabilities of the first wireless communication device; receive a sidelink repeating configuration based on the sidelink capability report; and communicate a first signal based on the sidelink repeating configuration.

According to another aspect of the present disclosure, a non-transitory computer-readable medium comprises program code recorded thereon. The program code comprises instructions executable by a processor to cause a first wireless communication device to: receive, from a second wireless communication device, a connection request; receive, from the second wireless communication device, a sidelink capability report indicating sidelink repeating capabilities of the second wireless communication device; and transmit, based on the sidelink capability report, a sidelink repeating configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
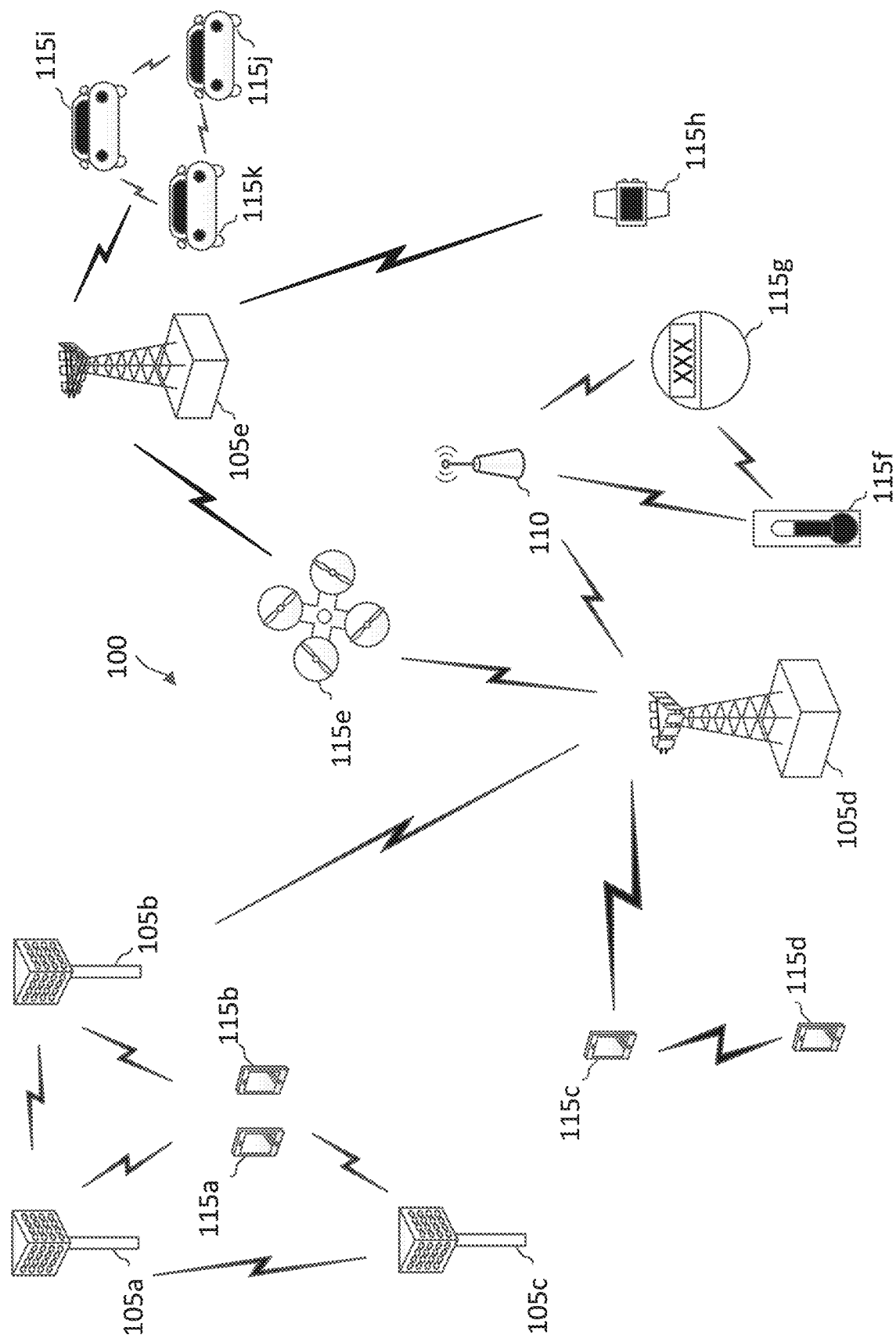
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

A 5G NR network may allow for sidelink communication between one or more user equipments (UEs). For example, sidelink communication may be used in a vehicle-to-everything (V2X) communication scenario in which multiple vehicles are communicating information regarding speed, position, route, emergency status, and/or any other suitable information. In another aspect, sidelink communication may be used in an industrial internet of things (IIOT) communication scenario in which sidelink communication devices (e.g., UEs) are communicating sensor, status, and/or other data to each other and/or to a controlling node, such as a programmable logic controller (PLC). In some of these use cases, it may be beneficial to support ultra-reliable low latency communications (URLLC) between the sidelink nodes.

A sidelink network may operate based on different architectures. For example, a sidelink network may operate in a mode 1 or a mode 2. In mode 1, a BS may control the sidelink communication by, for example, allocating sidelink time and frequency resources to each of the sidelink communication nodes. In some aspects, the BS operating in mode 1 may have more relaxed control of the sidelink communication. For example, the BS may delegate local scheduling for sidelink communications to a sidelink controlling node. In another example, a sidelink network may operate without a BS. Sidelink communication systems that operate without a BS may be referred to as mode 2 sidelink networks. In mode 2 sidelink communication, a controlling sidelink UE or node may schedule sidelink communications to, from, and/or between the other sidelink UEs in the network.

In some aspects, a sidelink communication link may be referred to as a "PC5" interface, whereas a communication link between a BS and a UE may be referred to as a "Uu" interface. In some aspects, a wireless communication device may be configured to communicate wirelessly with other wireless communication devices using a Uu interface, a PC5 interface, or both. For example, a wireless communication device may be configured with a first set of time/frequency resources for communicating over the Uu link, and a second set of time/frequency resources for communicating over the PC5 link.

A challenge for some sidelink communication scenarios may be obstructions or blockages in the communication path between sidelink nodes. For example, in an IIOT manufacturing scenario, one or more of the sidelink UEs may be mobile, and may be occasionally positioned so as to be physically blocked or obstructed from receiving and/or transmitting communications from or to a controlling sidelink node and/or other sidelink node. These blockages may increase the error rate of communications and/or increase latency, which may degrade URLLC performance. One approach to increasing the reliability of sidelink communications may be using relay devices or repeaters, such as smart repeaters or reflective intelligence surfaces (RIS). These repeaters may offer a relatively inexpensive solution to sub optimal sidelink communications by providing one or more secondary paths between the sidelink nodes.

Different types of repeaters or relay devices may have different capabilities or configurations. For example, some repeaters may support only amplify-and-forward (AF) operation with no signal decoding. Other repeaters may be configured to decode received signals (e.g., control information and/or data) before forwarding the received signals to other wireless communication devices. The role the repeater plays in a sidelink communication scenario may depend on its capabilities and configurations. For example, a wireless repeater may be configured with AF-only operation for sidelink communications, but may also be configured to decode and forward Uu signals (e.g., between a BS and a UE). In some aspects, a wireless repeater's capabilities may be more suitable for a BS-controlled sidelink communication architecture (e.g., mode 1 and/or mode 3). In another example, a wireless repeater's capabilities may be better exploited in a less BS-dependent sidelink communication architecture (e.g., mode 2 and/or mode 4). If a wireless repeater having a first set of capabilities is deployed in a sidelink communication scenario ill-suited for the wireless repeater, potential benefits and utilities of the repeater may not be fully exploited. Accordingly, sidelink communication performance may be negatively affected. For example, the reliability, latency, and/or throughput of the sidelink communications may not be significantly improved by the wireless repeater.

The present application describes mechanisms for indicating the sidelink repeating capabilities of a wireless repeater or relay device to one or more other wireless communication devices in a sidelink communication scenario, and for configuring the wireless repeater for sidelink repeating based on the repeating capabilities. For example, a sidelink communication scheme may include a wireless repeater transmitting, to a wireless communication device (e.g., BS, controlling sidelink UE), a sidelink capability report indicating repeating capabilities of the wireless repeater in a sidelink communication scenario. The communication scheme may further include the wireless communication device transmitting, to the wireless repeater based on the sidelink capability report, a sidelink repeater configuration. The sidelink repeater configuration may indicate one or more operating parameters for the wireless repeater, such as time and/or frequency resources for sidelink and/or Uu repeating, beam direction configurations, and/or transmit power configurations.

The sidelink capability report may be transmitted by the wireless repeater to a base station (BS), to a sidelink controlling node, and/or to one or more sidelink UEs. The operations of the wireless repeater may be controlled by the BS and/or the sidelink controlling node. The sidelink capability report may indicate, for example, the wireless repeater's decoding capabilities, beam capabilities, frequency granularity, carrier aggregation and switching capabilities, channel sensing capabilities, and/or any other suitable sidelink or repeater capability.

Aspects of the present disclosure may provide several benefits. For example, the repeater capability signaling schemes and mechanisms described in the present disclosure advantageously allow a wireless repeater to be configured and used in a sidelink communication scenario consistent with its capabilities. Thus, the repeater may be used in a mode of operation that more effectively uses the repeater in the sidelink communication scheme. Accordingly, the reliability, latency, throughput of the sidelink communications, power savings, and/or user experience can be more greatly improved by the repeater.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, and 105e) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used. A repeater 110 is also present in the network 100. The repeater 110 may be configured to relay communications between wireless communication devices in the network 100. For example, the repeater 110 may extend the coverage area of the network to areas that would otherwise be unavailable for communications. In dense settings with physical obstructions, the repeater 110 may improve reliability and network performance.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, and the repeater 110. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e. Other machine type devices, such as the UE 115f (e.g., a thermometer), the UE 115g (e.g., smart meter), and UE 115h (e.g., wearable device) may communicate through the network 100 either directly with BSs, such as the macro BS 105e, or in multi-step-size configurations by communicating with another user device (e.g., repeater 110), which relays its information to the network, such as the UE 115f communicating temperature measurement information to the smart meter, the UE 115g, which is then reported to the network through the repeater 110 and the BS 105d. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105. In some aspects, the repeater 110 may be configured to amplify-and-forward sidelink communications from one UE 115 to another UE 115, and/or between a UE 115 and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel A TXOP may also be referred to as channel occupancy time (COT).

In some aspects, the network 100 may provision for sidelink communications to allow a UE 115 to communicate with another UE 115 without tunneling through a BS 105 and/or the core network. The BS 105 may configure certain resources in a licensed band and/or an unlicensed band for sidelink communications between the UE 115 and the other UE 115. For example, as described above, to improve coverage and/or otherwise improve performance for URLLC applications, the network 100 may include the relay device or repeater 110. For example, the repeater 110 may include a smart repeater or reflective intelligent surface (RIS) to provide for additional communication paths and/or wider coverage area for UEs 115 communicating via sidelink. The repeater 110 may be used in different modes to provide different sidelink services. The present disclosure describes mechanisms for signaling a repeater's sidelink repeating capabilities, and for configuring the repeater based on the capability signaling.

Figure 2A:
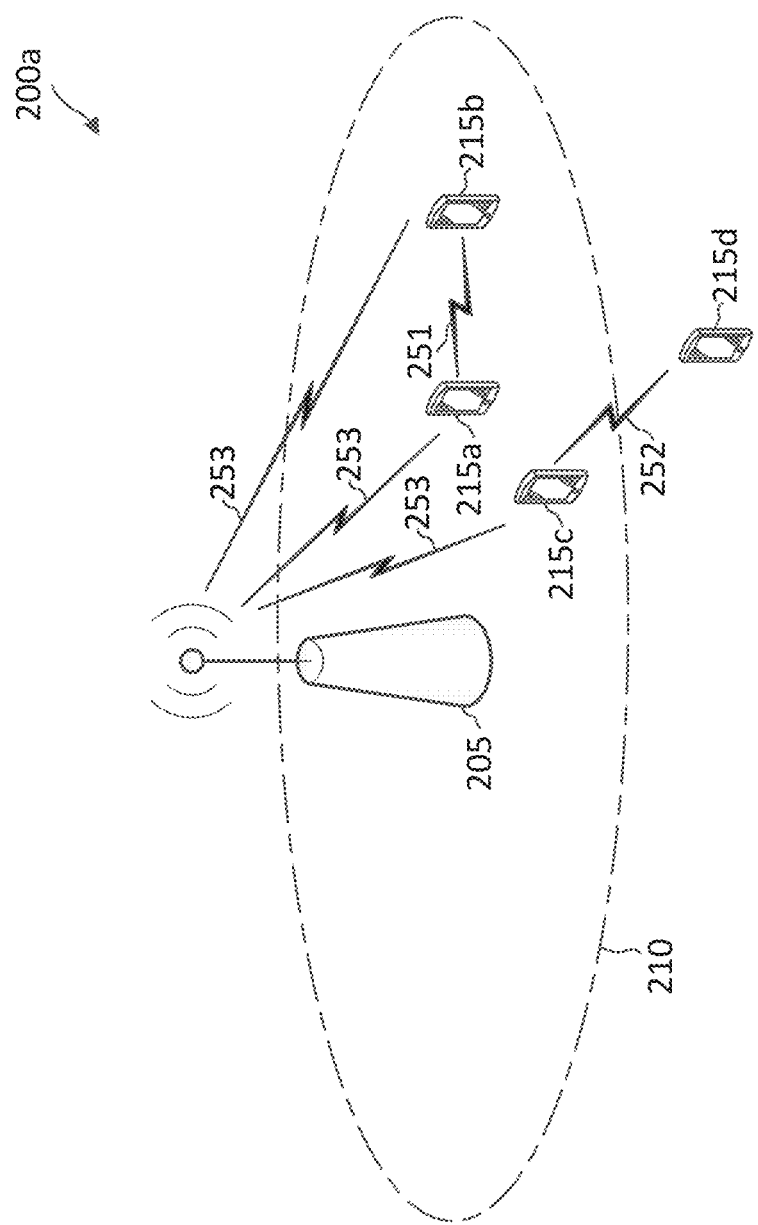
FIG. 2A illustrates a wireless communication network that provisions for sidelink communications according to some aspects of the present disclosure.

FIG. 2A illustrates an example of a wireless communication network 200a that provisions for sidelink communications according to embodiments of the present disclosure. The network 200a may be similar to the network 100. FIG. 2A illustrates one BS 205 and four UEs 215 for purposes of simplicity of discussion, though it will be recognized that embodiments of the present disclosure may scale to any suitable number of UEs 215 and/or BSs 205 (e.g., the about 2, 3, 6, 7, 8, or more). The BS 205 and the UEs 215 may be similar to the BSs 105 and the UEs 115, respectively. The BSs 205 and the UEs 215 may communicate over the same spectrum.

In the network 200a, some of the UEs 215 may communicate with each other in peer-to-peer communications. For example, the UE 215a may communicate with the UE 215b over a sidelink 251, and the UE 215c may communicate with the UE 215d over another sidelink 252. In some instances, the sidelinks 251 and 252 are unicast bidirectional links, each between a pair of UEs 215. In some other instances, the sidelinks 251 and 252 can be multicast links supporting multicast sidelink services among the UEs 215. For instance, the UE 215c may transmit multicast data to the UE 215d and the UE 215b over sidelinks. Some of the UEs 215 may also communicate with the BS 205 in a UL direction and/or a DL direction via communication links 253. For instance, the UE 215a, 215b, and 215c are within a coverage area 210 of the BS 205, and thus may be in communication with the BS 205. The UE 215d is outside the coverage area 210, and thus may not be in direct communication with the BS 205. In some instances, the UE 215c may operate as a relay for the UE 215d to reach the BS 205. In some aspects, some of the UEs 215 are associated with vehicles (e.g., similar to the UEs 115i-k) and the communications over the sidelinks 251 and/or 252 may be C-V2X communications or IIOT communications.

In some aspects, the network 200a may be a LTE network or a 5G NR. The transmissions by the UE 215a and the UE 215b over the sidelink 251 and/or the transmissions by the UE 215c and the UE 215d over the sidelink 252 may use a LTE PUSCH waveform, which is a discrete Fourier transform-spreading (DFT-s) based waveform. In some aspects, the network 200a may be an NR network. The transmissions by the UEs 215 over the sidelinks 251 and/or 252 may use a cyclic-prefix-OFDM (CP-OFDM) waveform.

Figure 2B:
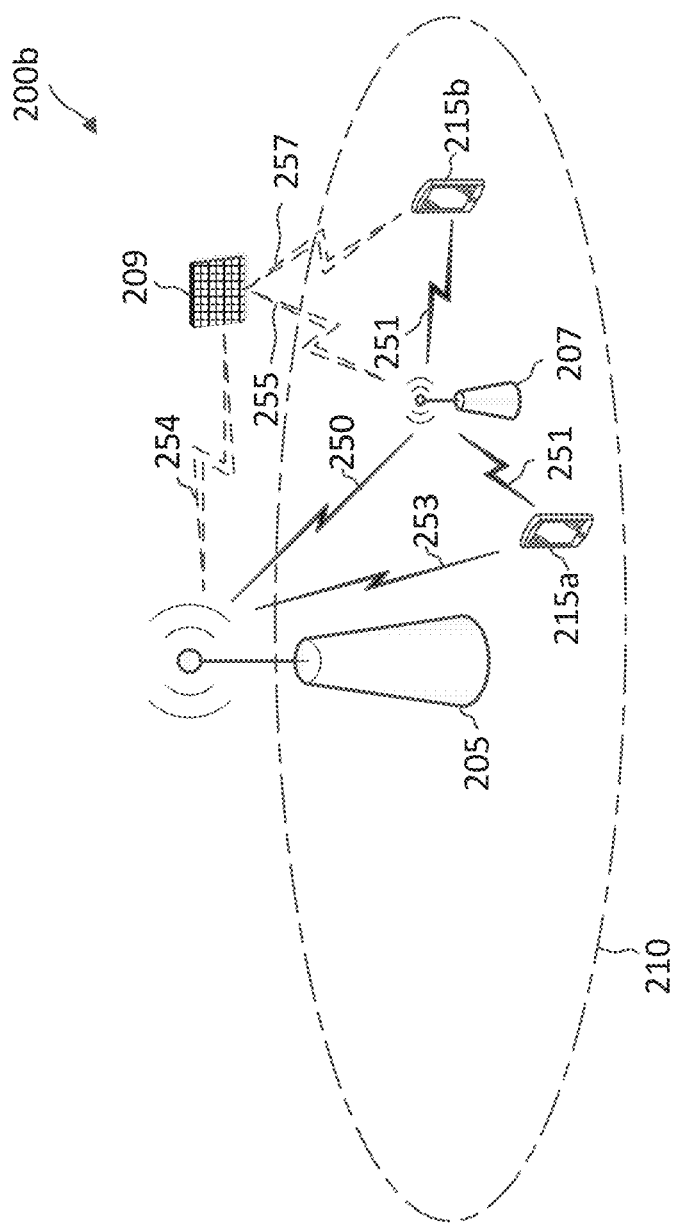
FIG. 2B illustrates a wireless communication network that provisions for sidelink communications using a wireless repeater according to some aspects of the present disclosure.
Figure 2C:
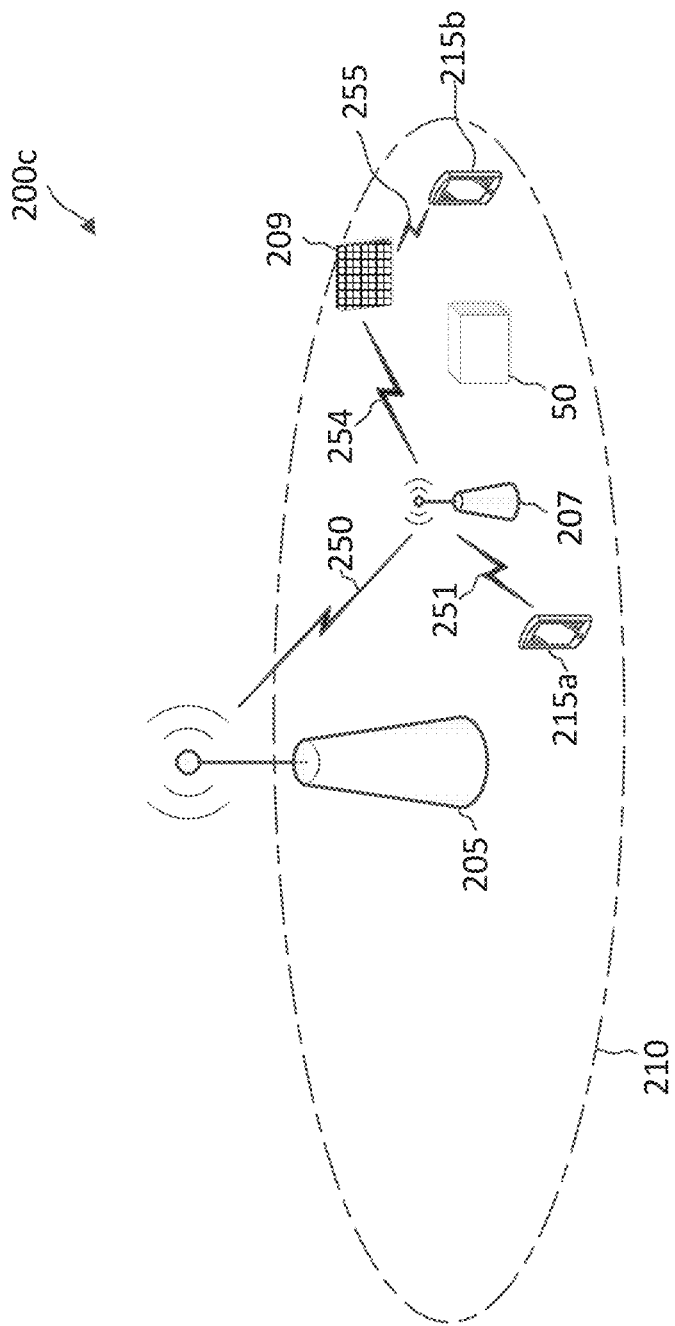
FIG. 2C illustrates a wireless communication network that provisions for sidelink communications using a wireless repeater according to some aspects of the present disclosure.

FIGS. 2B and 2C illustrate wireless communication networks 200b, 200c that provision for sidelink communication in which a sidelink controlling node 207 and a repeater 209 are deployed. For the purposes of the present disclosure, the repeater 209 may be referred to as an assisting node (AN) or a relay device. The repeater 209 may include a reflective intelligent surface (RIS), smart repeater, or any other suitable type of relay device. The controlling node 207 may include a sidelink UE, for example. In some aspects, the controlling node 207 may have more sidelink capabilities than the UEs 215. For example, the controlling node 207 may be configured for local scheduling of sidelink resources for communications with the sidelink UEs 215. In other aspects, the controlling node 207 may have more advanced beam capabilities than the UEs 215, greater coverage area, and/or greater bandwidth compared to the UEs 215. Each of FIGS. 2B and 2C illustrates a different control node and repeater deployment scheme for the sidelink communications. In this regard, FIG. 2B illustrates a first mode or sidelink architecture in which the repeater 209 is configured and controlled by the BS 205. The repeater 209 may be configured to amplify and forward communications between the BS 205 and the controlling node 207, and/or between the BS 205 and one or more of the UEs 215. In another example, the repeater 209 may be configured to amplify and forward communications between the controlling node 207 and one or more UEs 215. In another example, the repeater 209 may be configured to amplify and forward communications between two or more sidelink UEs 215. In another example, the repeater 209 may be configured to decode and forward communications between the BS 205 and the controlling node 207, and/or between the BS 205 and the one or more of the UEs 215. In another example, the repeater 209 may be configured to decode and forward communications between the controlling node 207 and one or more UEs 215. In another example, the repeater 209 may be configured to decode and forward communications between two or more sidelink UEs 215. Further, it will be understood that the repeater 209 may be configured to perform repeating operations in a combination of the scenarios presented above. For example, the repeater 209 may be configured to amplify and forward, and/or decode and forward, communications between the BS 205 and the controlling node 207, between the controlling node 207 and one or more UEs 215, between the BS 205 and one or more UEs 215, and/or between individual UEs 215.

In some aspects, the repeater 209 may be configured to decode one or more of a physical sidelink control channel (PSCCH), a physical sidelink shared channel (PSSCH), a physical sidelink feedback channel (PSFCH), a physical broadcast channel (PBCH), and/or a physical sidelink discovery channel (PSDCH). The decoding capability may allow for an improved signal-to-noise ratio (SNR) in the communications between the BS 205, the controlling node 207, and/or the sidelink UEs 215. In some aspects, the scheme shown in FIG. 2B may be referred to as mode 1 sidelink communication.

In mode 1 sidelink communication, the BS 205 communicates with the controlling node 207 via a first link 250. The first link 250 may be a Uu interface. In another example, the first link 250 may be a sidelink interface. The BS 205 also communicates directly to at least one of the UEs 215a via a communication link 253. In some aspects, the BS 205 may communicate control information (e.g., DCI, RRC configurations) to the controlling node 207 via the first link 250. In some aspects, the BS 205 may receive control information and/or sidelink data from the controlling node 207 via the first link 250. In some aspects, the BS 205 may allocate sidelink resources or resource pools directly to the UEs 215 via communication links 253. Further, the BS 205 may communicate control information to and/or from the UEs 215 via the communication link 253. The UEs 215 may communicate sidelink data to the controlling node 207 via sidelinks 251. For example, the network 200b may be deployed in an industrial Internet of things (IIOT) scenario in a factory or other industrial environment. The UEs 215 may be in communication with sensors, machinery, and/or other industrial components. The UEs 215 may be configured to communicate the data to the controlling node 207. The controlling node 207 may be in communication with a processing system or controller for the industrial equipment. For example, the controlling node 207 may be in communication with a programmable logic controller (PLC) configured to receive the sensor data and control machinery based on the sensor data.

The repeater 209 is deployed in the network 200b and is configured to communicate with the BS 205 via a second link 254. The repeater 209 is also configured to communicate with at least the controlling node 207 via a third link 255. In some aspects, the second link 254 may be a Uu link, or a sidelink. In some aspects, the third link 255 may be a Uu link or a sidelink. In some aspects, the second link 254 and the third link 255 may provide alternative links or communication paths between the BS 205 and the controlling node 207. In other aspects, the first link 254 and the third link 255 may be a primary communication path between the BS 205 and the controlling node 207. For example, the BS 205 may perform the same functions described above with respect to the first link 250 using the second link 254 and the third link 255.

In some aspects, the repeater 209 may be further configured to communicate directly to one or more of the UEs 215. For example, the repeater 209 may provide a communication path between the controlling node 207 and the one or more UEs 215. The repeater 209 may receive control information and/or commands via a Uu link 254 for sidelink repeating operations between the repeater 209 and the controlling node 207. The repeater 209, based on the control information, may also repeat sidelink communications between the sidelink UE 215b and the controlling node 207 using links 255 and 257. In another example, the repeater 209 may provide a communication path between the BS 205 and the one or more UEs 215.

FIG. 2C illustrates a network 200c in which the controlling node 207 and the repeater 209 are deployed according to a different architecture or mode. For example, the scenario illustrated in FIG. 2C may be a mode 2 sidelink operation in which the controlling node 207 may autonomously or semi-autonomously schedule sidelink communications and allocate sidelink resources. In this regard, the BS 205 may communicate with the controlling node 207 via the first communication link 250, but may not communicate directly with the UEs 215. In the example shown in FIG. 2C, the controlling node 207 communicates with the UEs 215 via sidelinks 251. Although the BS 205 is shown in the network 200c, in some aspects, the BS 205 may not be present in the network 200c. For example, the controlling node 207 may operate autonomously without communicating with the BS 205.

In some aspects, the controlling node 207 may also control or configure the repeater 209. For example, the controlling node 207 may allocate sidelink resources or resource pools, schedule on/off times for the repeater 209, transmit beam configurations, power configurations, and/or any other suitable communication configuration. In some instances, an obstacle 50 may be present that blocks sidelink communications between the controlling node 207 and at least one of the UEs (e.g., 215b). Accordingly, the controlling node 207 may communicate with the blocked UE 215b via the repeater 209. In particular, the controlling node 207 may transmit and receive sidelink communications from the UE 215b via a second link 254 and a third link 255, as shown.

Referring generally to FIGS. 2B and 2C, the operation of the repeater 209 may be based on the repeater's capabilities. For example, in some aspects, the repeater 209 may be more suitable for one sidelink communication mode (e.g., mode A), and less suitable for a different sidelink communication mode (e.g., mode B, mode 2). In some instances, a repeater 209 may have more capabilities (e.g., decoding and forwarding, beamforming), such that the use of the repeater 209 may be more advantageous in certain configurations. The present disclosure describes schemes and mechanisms for signaling sidelink repeater capabilities, and for configuring a repeater for sidelink communications based on the signaled sidelink repeater capability.

Figure 3:
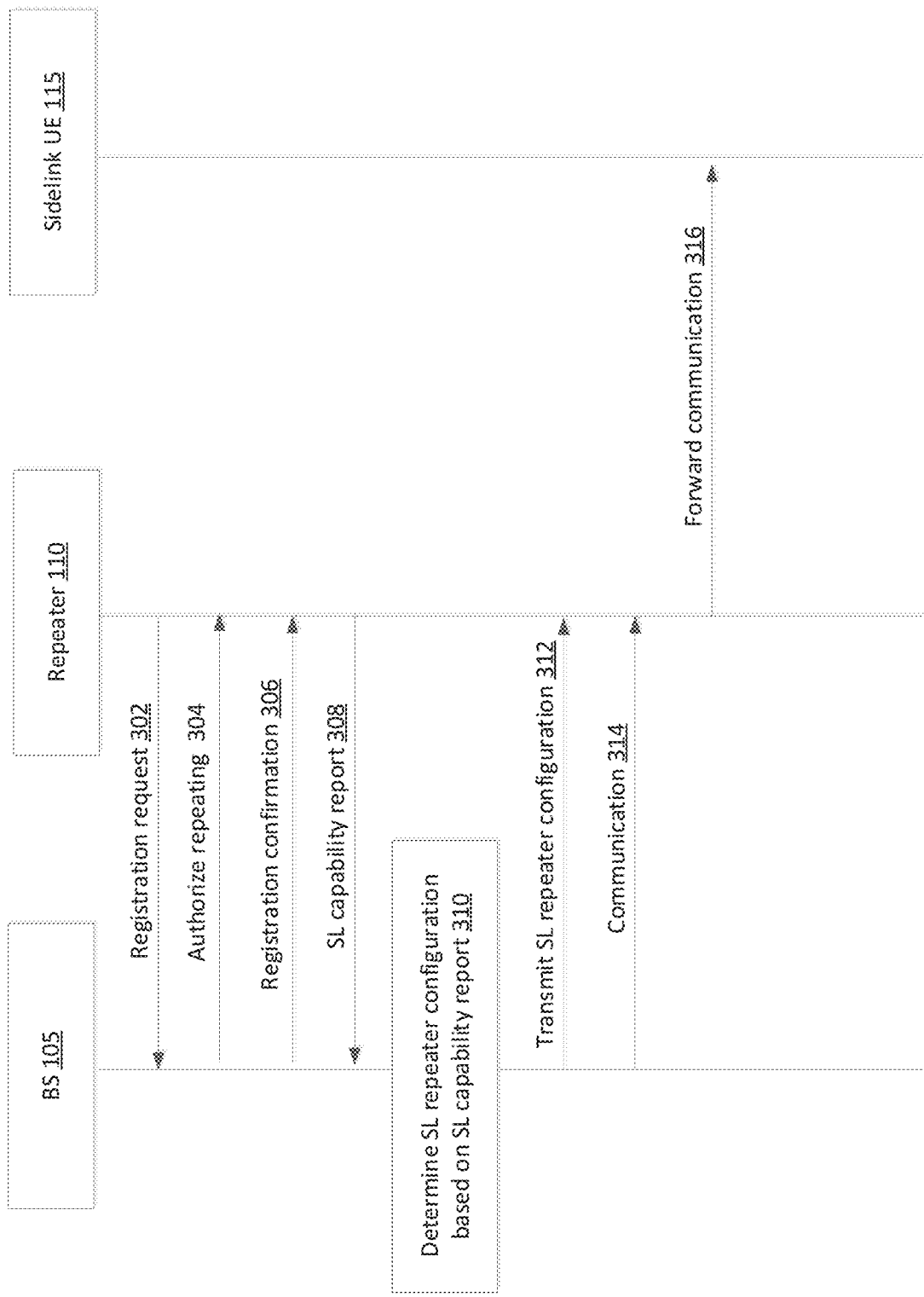
FIG. 3 is a signaling diagram illustrating a sidelink relay method according to some aspects of the present disclosure.

FIG. 3 is a signaling diagram of a method 300 for reporting sidelink repeater capabilities, according to an aspect of the present disclosure. The method 300 may be performed by a BS 105, a repeater 110, and a sidelink UE 115. The BS 105 may be one of the BSs 105 in the network 100, and/or one of the BSs 205 in one of the networks 200a-200c. The sidelink UE 115 may be one of the UEs 115 in the network 100, one of the UEs 215 in the networks 200a-200c, or the controlling node 207 in the networks 200b, 200c. The repeater 110 may be one of the UEs 115 in the network 100, or one of the repeaters 209 in the networks 200b, 200c. According to the method 300, the repeater 110 may signal its repeating and/or sidelink communication capabilities to the network via the BS 105, and may receive a sidelink repeating configuration based on the signaled capabilities.

At action 302, the repeater 110 transmits, and the BS 105 receives, a registration request. In some aspects, the registration request indicates a request for the repeater 110 to perform repeater operations in a sidelink network. In some aspects, action 302 may be part of a cell search and/or initial access procedure. In some aspects, action 302 may include performing a random access procedure and establishing a radio resource control (RRC) connection status. For example, in some aspects, the BS 105 may transmit system information to the second wireless communication device (e.g., MIB, SIB1), receive a RACH preamble, transmit a RACH response, receive a RRC Setup Request message, transmit a RRC Setup message, receive a RRC Setup Complete message, and receiving a non-access stratum (NAS) Registration indication. Action 302 may further include additional NAS registration, UE capability signaling, and/or registration completion acknowledgement procedures.

In some aspects, action 302 may further include the repeater 110 transmitting, and the BS 105 receiving, one or more repeater configurations and/or capabilities. For example, the BS 105 may receive, from the repeater 110, a signal indicating that the repeater 110 supports repeating for sidelink (PC5) and/or Uu communication links. In other aspects, action 302 may be omitted from the method 300. For example, the repeater 110 may be configured to perform repeating operations in the network without being registered to the network.

At action 304, the BS 105 transmits, to the repeater 110, a signal authorizing the second wireless communication device to perform sidelink repeating operations during the registration protocol. Accordingly, while the BS 105 communicates with higher layers of the protocol stack (e.g., NAS), the repeater 110 may be configured to perform at least some repeating operations in the sidelink network. In some aspects, action 304 includes the BS 105 transmitting an RRC message indicating a connection confirmation. In some aspects the RRC communication may be transmitted in a PDSCH, PSSCH, and/or any other suitable channel. In other aspects, the authorization signal may include transmitting a MAC-CE and/or MAC-PDU. In other aspects, transmitting the authorization signal may include transmitting the signal in a PSCCH, PDCCH, and/or any other suitable communication channel.

At action 306, the BS 105 transmits, and the repeater 110 receives, a registration confirmation message. In some aspects, the registration confirmation message may include a RRC message indicating that the repeater 110 has successfully registered on the network. In some aspects, the message may include or indicate authorization for communicating in the network from one or more higher layers in the network (e.g., distributed unit (DU), centralized unit (CU), core network (CN). In some aspects, actions 304 and 306 may be accomplished in a same step. For example, action 304 and 306 may include transmitting a registration confirmation message that authorizes the second wireless communication device to perform sidelink repeating operations.

At action 308, the repeater 110 transmits, to the BS 105, a sidelink capability report. The sidelink capability report may indicate sidelink repeating capabilities of the repeater 110. In some aspects, action 308 includes transmitting, to the BS 105, a RRC message, a MAC-CE, MAC-PDU, UCI, SCI, and/or any other suitable type of communication. For example, action 308 may include the repeater 110 transmitting a RepeaterCapabilitySidelink RRC message. In some aspects, the repeater 110 transmits the sidelink capability report in response to being registered to the network associated with the BS 105.

The sidelink capability report may include or indicate one or more capabilities of the repeater 110 associated with repeating operations and/or sidelink communications. For example, the sidelink capability report may include or indicate a sidelink synchronization signal block (S-SSB) capability. The S-SSB capability may include or indicate the repeater's 110 ability to transmit and/or receive a S-SSB. In some aspects, the S-SSB capability may include or indicate the repeater's 110 ability to decode and/or amplify and forward a S-SSB. For example, the sidelink capability report may indicate that the repeater 110 is configured to receive, but not transmit, a S-SSB. In another example, the sidelink capability report may indicate that the repeater 110 is configured to receive, decode, and transmit a S-SSB. In other examples, the sidelink capability report may indicate that the repeater 110 is configured only to amplify-and-forward (AF) an S-SSB. Other SSB Tx/Rx capabilities may also be included in the sidelink capability report. For example, the sidelink capability report may indicate a supported tx/rx periodicity of the S-SSB. For example, the sidelink capability report may indicate that the repeater 110 is configured to transmit and/or receive up to 20 S-SSB within 160 ms, up to 40 S-SSB within 160 ms, up to 60 S-SSB within 160 ms, and/or any other suitable S-SSB periodicity configuration.

In another aspect, the sidelink capability report may include or indicate the repeater's 110 ability for physical sidelink control channel (PSCCH) decoding. For example, the sidelink capability report may indicate whether the repeater 110 is configured to decode a PSCCH, or is only configured for AF of the PSCCH. In another aspect, the sidelink capability report may indicate how many PSCCH decodings and/or transmissions the repeater 110 can perform within a time period (e.g., frame, slot, sub-slot, etc.). In another aspect, the sidelink capability report may include or indicate the repeater's 110 capability for physical sidelink shared channel (PSSCH) decoding. For example, the sidelink capability report may indicate whether the repeater 110 is configured to decode a PSSCH, or is only configured for AF of the PSSCH. In another aspect, the sidelink capability report may indicate how many PSSCH decodings and/or transmissions the repeater 110 can perform within a time period (e.g., frame, slot, sub-slot, etc.). In another aspect, the sidelink capability report may indicate a number of SCI-2 the repeater 110 can transmit and/or receive in a time period (e.g., frame, slot, sub-slot, etc.). In another aspect, the sidelink capability report may indicate whether the repeater 110 is configured to decode SCI. In another aspect, the sidelink capability report may include or indicate the repeater's 110 ability for physical sidelink feedback channel (PSFCH) decoding. For example, the sidelink capability report may indicate whether the repeater 110 is configured to decode a PSFCH, or is only configured for AF of the PSFCH. In another aspect, the sidelink capability report may indicate the number of PSFCH the repeater 110 can simultaneously receive and/or decode. In some aspects, the sidelink capability report may indicate that the repeater 110 is configured to simultaneously transmit M PSFCH communications. In another aspect, the sidelink capability report may indicate that the repeater 110 is configured to simultaneously receive N PSFCH communications.

In another aspect, the sidelink capability report may include or indicate beam capabilities of the repeater 110. For example, the sidelink capability report may indicate a number of radiofrequency Tx/Rx panels or antennas that can be used for sidelink communications. In another aspect, the sidelink capability report may indicate a number of simultaneous transmit/receive beams that can be used for sidelink communications and/or Uu communications with a BS and/or UE. In another aspect, the sidelink capability report may indicate a power class associated with the repeater 110. For example, the sidelink communication report may indicate a transmit power class of the repeater 110. In another aspect, the sidelink capability report may indicate a frequency granularity of the repeater 110. In some aspects, the frequency granularity may include a subcarrier spacing (SCS), supported bandwidth, and/or tunable frequency granularity and its associated delay. In one example, the indicated frequency granularity may include a maximum supported bandwidth and/or one bandwidth of a few preconfigured bandwidths, such as 5 MHz, 20 MHz, 40 MHz, 100 MHz, and/or any other suitable bandwidth. In another example, the frequency granularity indicated in the sidelink capability report may indicate that the repeater 110 may support bandwidths that are integer multiples of a bandwidth B up to a maximum of Bmax. In some aspects, B can be indicated in kHz or MHz. In some aspects, the sidelink capability report may indicate a frequency-selective amplify-and-forward granularity. In another aspect, the sidelink capability report may indicate AF decoding/processing capabilities for each carrier and/or for each bandwidth part (BWP). In another aspect, the sidelink capability report may indicate AF decoding/processing capabilities for one or more carriers, including a combination or set of carriers. In another aspect, the sidelink capability report may indicate a carrier capability of the repeater 110. For example, the sidelink capability report may indicate whether the repeater 110 is configured for simultaneous operation on Uu and PC5 communication links. Further, the sidelink capability report may indicate whether the repeater 110 is configured to switch between carriers. The sidelink capability report may indicate a switching delay associated with the repeater 110 switching between the carriers. In some aspects, the sidelink capability report may indicate a sensing or measuring capability of the repeater 110. For example, the sidelink capability report may indicate whether the repeater 110 is configured for spectrum sensing or energy detection for autonomous PC5 operation. In another aspect, the sidelink capability report may indicate whether the repeater 110 is configured to measure reference signal reserve power (RSRP), received signal strength indicator (RSSI), and/or channel busy ratio (CBR) of sidelink signals and channels. In another aspect, the sidelink capability report may indicate the repeater's 110 capability for SL-CSI-RS transmission and/or reception.

In some aspects, the sidelink capability report may indicate a class or category of repeater. Each class or category of repeater may be associated with one or more of the capabilities described above. For example, the sidelink capability report may indicate a first repeater class associated with a first S-SSB capability, a first decoding (e.g., PSCCH, PSSCH, and/or PSFCH) capability, a first beam capability, a first power class, a first frequency capability, a first frequency granularity, and/or a first sensing measurement capability. In some aspects, the first repeater class may indicate, for example, that AF operation is used for all sidelink channels. In another example, the repeater class may indicate that the repeater 110 is configured to simultaneously receive and decode M PSFCH, and simultaneously transmit N PSFCH. For example, the BS 105 receiving the sidelink capability report may be configured with a table indicating the sidelink capabilities associated with a signaled repeater class. Accordingly, the BS 105 may be configured to identify or determine the capabilities of the repeater 110 based on the indicated repeater class.

At action 310, the BS 105 determines, based on the sidelink capability report, a sidelink repeater configuration for the repeater 110. In some aspects, the sidelink repeating configuration may indicate parameters or configurations for PC5 repeating operation, Uu repeating operation, or both PC5 and Uu repeating operation. In some aspects, the sidelink repeating configuration may indicate on and/or off time periods for repeating operations. For example, the sidelink repeating configuration may indicate semi-static time resources (e.g., frames, slots, sub-slots, symbols, etc.) at which the repeater 110 will be "on" and performing sidelink repeating operations. In another aspect, the sidelink repeating configuration may indicate frequency carriers, BWPs, and/or other frequency resources for sidelink communication, Uu communication, and/or both sidelink communication and Uu communication. In some aspects, the sidelink repeating configuration may indicate one or more beam directions for receiving Uu communications (e.g., from the BS). In another aspect, the sidelink repeating configuration may indicate one or more beam directions for receiving sidelink signals. In another aspect, the sidelink repeating configuration may indicate one or more beam directions for transmitting Uu and/or sidelink communications. In another aspect, the sidelink repeating configuration may indicate a transmit power configuration for the repeater 110. For example, the sidelink repeating configuration may indicate a maximum power and/or a power split for each of a plurality of carriers (e.g., a maximum power for each of the plurality of carriers and/or an aggregate maximum power across the plurality of carriers). The transmit power may be specific to sidelink communications or Uu communications, or may be common for Uu and sidelink communications.

At action 312, the BS 105 transmits, and the repeater 110 receives, the sidelink repeater configuration. In some aspects, transmitting the sidelink repeater configuration comprises transmitting a RRC message indicating the configuration. In other aspects, transmitting the sidelink repeater configuration comprises transmitting a media access control-control element (MAC-CE) and/or a MAC protocol data unit (PDU) indicating the configuration. In some aspects, the BS 105 may transmit the sidelink repeater configuration in a shared channel. For example, the BS 105 may transmit the configuration in a PDSCH, a PSSCH, and/or any other suitable channel.

At action 314, the BS 105 transmits a communication. The communication may include control information, data, reference signals, and/or any other suitable type of communication. In some aspects, action 314 includes transmitting in a control channel, shared channel or data channel, sidelink channel, broadcast channel, feedback channel, and/or any other suitable type of channel. For example, action 314 may include transmitting the communication in a PDSCH, PDCCH, PSSCH, PSCCH, PSFCH, PBCH, and/or any other channel.

At action 316, the repeater 110 forwards the communication to a sidelink UE 115. In some aspects, action 316 includes performing an amplify-and-forward (AF) operation. In some aspects, the repeater 110 decodes and forwards the communication to the sidelink UE 115. In the illustrated example, the communication originates at the BS 105. For example, the repeater 110 may receive the communication from the BS 105, and forward the communication to the sidelink UE 115. In other aspects, the communication originates at a different wireless communication device. For example, the communication may originate at a different sidelink UE. In some aspects, the sidelink UE 115 may include a controlling sidelink UE or node. In this regard, the communication may include or indicate control information intended for the sidelink UE 115. In some aspects, the control information may indicate sidelink resources and/or configurations for performing sidelink communications in the sidelink network. In other aspects, the communication may originate at a different sidelink UE in the sidelink network. For example, the repeater 110 may receive sidelink data from a different sidelink UE, and forward the sidelink communication to the sidelink UE 115.

Figure 4:
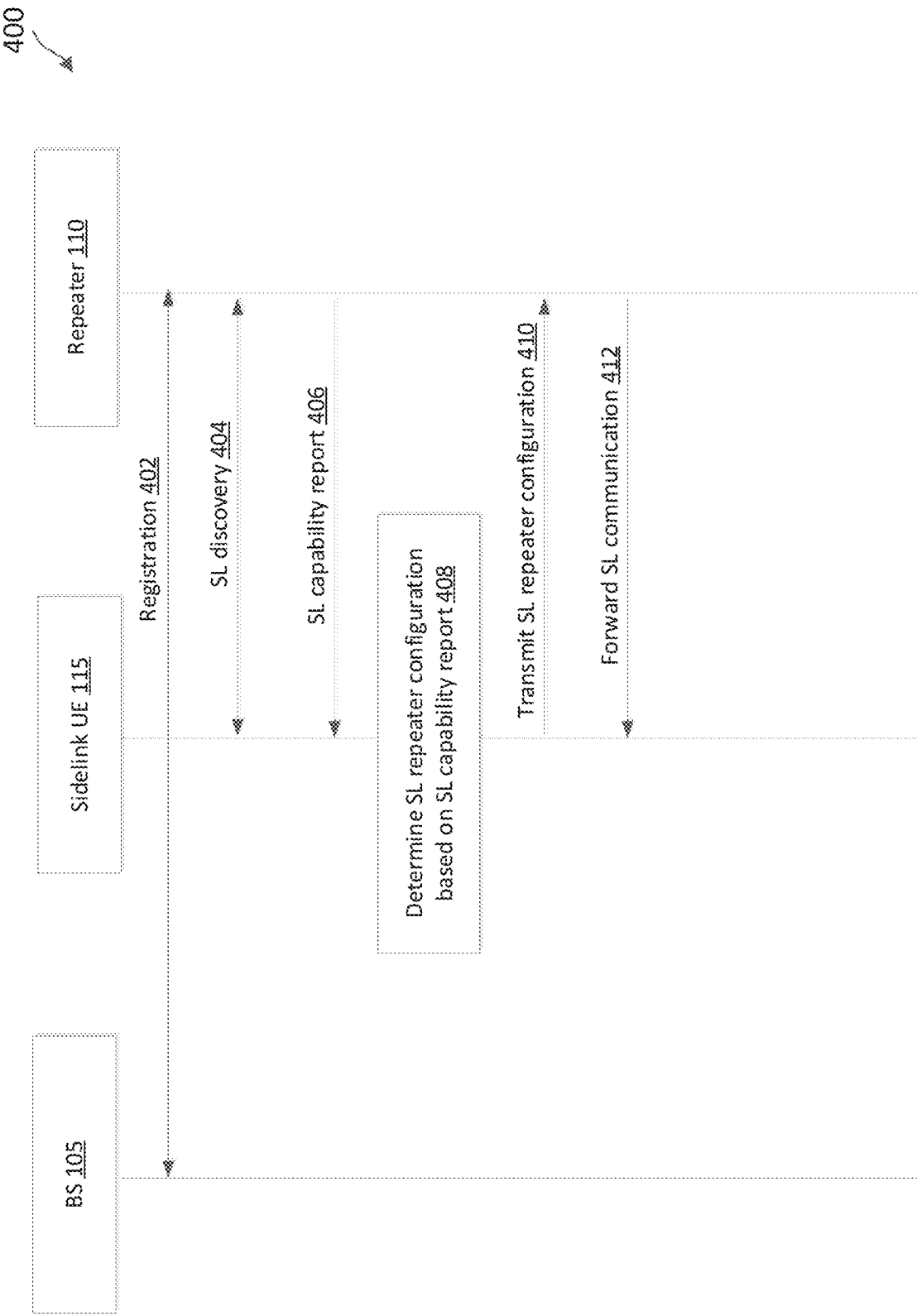
FIG. 4 is a signaling diagram illustrating a sidelink relay method according to some aspects of the present disclosure.

FIG. 4 is a signaling diagram of a method 400 for reporting sidelink repeater capabilities, according to an aspect of the present disclosure. The method 400 may be performed by a BS 105, a repeater 110, and a sidelink UE 115. The BS 105 may be one of the BSs 105 in the network 100, on one of the BSs 205 in one of the networks 200a-200c. The sidelink UE 115 may be on one of the UEs 115 in the network 100, one of the UEs 215 in the networks 200a-200c, or the controlling node 207 in the networks 200b, 200c. The repeater 110 may be one of the UEs 115 in the network 100, or one of the repeaters 209 in the networks 200b, 200c. According to the method 400, the repeater 110 may signal its repeating and/or sidelink communication capabilities to the sidelink UE 115, and may receive a sidelink repeating configuration based on the signaled capabilities from the sidelink UE 115. In an exemplary aspect, the sidelink UE 115 may be a controlling sidelink UE or controlling node. For example, the sidelink UE 115 may be coupled with a programmable logic controller (PLC).

At action 402, the repeater is registered to the network via the BS 105. In some aspects, action 402 may include performing a random access procedure and establishing a radio resource control (RRC) connection status. For example, in some aspects, the BS 105 may transmit system information to the second wireless communication device (e.g., MIB, SIB1), receive a RACH preamble, transmit a RACH response, receive a RRC Setup Request message, transmit a RRC Setup message, receive a RRC Setup Complete message, and receiving NAS Registration indication. Action 402 may further include additional NAS registration, UE capability signaling, and/or registration completion acknowledgement procedures. In some aspects, action 402 may be omitted from the method 400. For example, the repeater 110 may be configured to perform repeating operations without first being registered to the network.

At action 404, the repeater 110 and the sidelink UE 115 perform a sidelink discovery procedure. For example, the repeater 110 may signal its presence to a sidelink UE 115, and the sidelink UE 115 may signal its presence to the repeater 110. The sidelink discovery procedure may further include transmitting and/or receiving sidelink control information (SCI) to or from the sidelink UE 115. The sidelink discovery procedure may include communicating in a physical sidelink discovery channel (PSDCH), for example. In some aspects, the sidelink discovery procedure may further include transmitting or signaling an identity of the repeater 110, and/or receiving a signal indicating an identity of another sidelink UE. In some aspects, action 404 may be omitted from the method 400. For example, the repeater 110 may be configured to perform repeating operations without first performing the sidelink discovery procedure.

In some aspects, action 404 may further include the repeater 110 transmitting, to a sidelink UE 115, one or more repeater configurations and/or capabilities. For example, the repeater 110 may transmit, to a base station, a signal indicating that the repeater 110 supports repeating for sidelink (PC5) and/or Uu communication links. In some aspects, action 404 may further include the repeater 110 receiving a signal authorizing the repeater 110 to perform sidelink repeating operations during the registration protocol. In some aspects, the repeater 110 is configured to share the sidelink configurations or capabilities described above in response to receiving a request from a network, for example via a BS.

In some aspects, action 404 may further include the repeater 110 transmitting, and the sidelink UE 115 receiving, one or more repeater configurations and/or capabilities. For example, the sidelink UE 115 may receive, from the repeater 110, a signal indicating that the repeater 110 supports repeating for sidelink (PC5) and/or Uu communication links.

At action 406, the repeater 110 transmits, to the sidelink UE 115, a sidelink capability report. The sidelink capability report may indicate sidelink repeating capabilities of the repeater 110. In some aspects, action 408 includes transmitting, to the sidelink UE 115, a RRC message. For example, action 408 may include the repeater 110 transmitting a PC5RepeaterCapabilitySidelink RRC message. In some aspects, the repeater 110 transmits the sidelink capability report in response to being authorized by the higher layers of the network's protocol stack. For example, the sidelink UE 115 and the BS 105 may communicate signals to authorize the repeater 110 for communicating in the network.

The sidelink capability report may include or indicate one or more capabilities of the repeater 110 associated with repeating operations and/or sidelink communications. For example, the sidelink capability report may include or indicate a sidelink synchronization signal block (S-SSB) capability. The S-SSB capability may include or indicate the repeater's 110 ability to transmit and/or receive a S-SSB. In some aspects, the S-SSB capability may include or indicate the repeater's 110 ability to decode and/or amplify and forward a S-SSB. For example, the sidelink capability report may indicate that the repeater 110 is configured to receive, but not transmit, a S-SSB. In another example, the sidelink capability report may indicate that the repeater 110 is configured to receive, decode, and transmit a S-SSB. In other examples, the sidelink capability report may indicate that the repeater 110 is configured only to amplify-and-forward (AF) an S-SSB. Other SSB Tx/Rx capabilities may also be included in the sidelink capability report.

In another aspect, the sidelink capability report may include or indicate the repeater's 110 ability for physical sidelink control channel (PSCCH) decoding. For example, the sidelink capability report may indicate whether the repeater 110 is configured to decode a PSCCH, or is only configured for AF of the PSCCH. In another aspect, the sidelink capability report may indicate how many PSCCH decodings and/or transmissions the repeater 110 can perform within a slot. In another aspect, the sidelink capability report may include or indicate the repeater's 110 capability for decoding a sidelink data channel, such as physical sidelink shared channel (PSSCH) decoding. For example, the sidelink capability report may indicate whether the repeater 110 is configured to decode a PSSCH, or is only configured for AF of the PSSCH. In another aspect, the sidelink capability report may indicate how many PSSCH decodings and/or transmissions the repeater 110 can perform within a slot. In another aspect, the sidelink capability report may indicate a number of SCI-2 the repeater 110 can transmit and/or receive in a slot. In another aspect, the sidelink capability report may indicate whether the repeater 110 is configured to decode SCI. In another aspect, the sidelink capability report may include or indicate the repeater's 110 ability for physical sidelink feedback channel (PSFCH) decoding. For example, the sidelink capability report may indicate whether the repeater 110 is configured to decode a PSFCH, or is only configured for AF of the PSFCH. In another aspect, the sidelink capability report may indicate the number of PSFCH the repeater 110 can simultaneously receive and/or decode. In some aspects, the sidelink capability report may indicate that the repeater 110 is configured to simultaneously transmit M PSFCH communications. In another aspect, the sidelink capability report may indicate that the repeater 110 is configured to simultaneously receive N PSFCH communications.

In another aspect, the sidelink capability report may include or indicate beam capabilities of the repeater 110. For example, the sidelink capability report may indicate a number of radiofrequency Tx/Rx panels or antennas that can be used for sidelink transmission. In another aspect, the sidelink capability report may indicate a number of simultaneous transmit/receive beams that can be used for sidelink communication and/or Uu communication with a BS and/or UE. In another aspect, the sidelink capability report may indicate a power class associated with the repeater 110. For example, the sidelink communication report may indicate a transmit power class of the repeater 110. In another aspect, the sidelink capability report may indicate a frequency granularity of the repeater 110. For example, the sidelink capability report may indicate a frequency-selective amplify-and-forward granularity. In another aspect, the sidelink capability report may indicate AF operation for each carrier and/or for each bandwidth part (BWP). In another aspect, the sidelink capability report may indicate AF decoding/processing capabilities for one or more carriers, including a combination or set of carriers. In another aspect, the sidelink capability report may indicate a carrier capability of the repeater 110. For example, the sidelink capability report may indicate whether the repeater 110 is configured for simultaneous operation on Uu and PC5 communication links. Further, the sidelink capability report may indicate whether the repeater 110 is configured to switch between carriers. The sidelink capability report may indicate a switching delay associated with switching between the carriers. In some aspects, the sidelink capability report may indicate a sensing or measuring capability of the repeater 110. For example, the sidelink capability report may indicate whether the repeater 110 is configured for spectrum sensing or energy detection for autonomous PC5 operation. In another aspect, the sidelink capability report may indicate whether the repeater 110 is configured to measure reference signal reserve power (RSRP), received signal strength indicator (RSSI), and/or channel busy ratio (CBR) of sidelink signals and channels. In another aspect, the sidelink capability report may indicate the repeater's 110 capability for SL-CSI-RS transmission and/or reception.

In some aspects, the sidelink capability report may indicate a class or category of repeater. Each class or category of repeater may be associated with one or more of the capabilities described above. For example, the sidelink capability report may indicate a first repeater class associated with a first S-SSB capability, a first decoding (e.g., PSCCH, PSSCH, and/or PSFCH) capability, a first beam capability, a first power class, a first frequency capability, a first frequency granularity, and/or a first sensing measurement capability. In some aspects, the first repeater class may indicate, for example, that AF operation is used for all sidelink channels. In another example, the repeater class may indicate that the repeater 110 is configured to simultaneously receive and decode M PSFCH, and simultaneously transmit N PSFCH. For example, the sidelink UE 115 receiving the sidelink capability report may be configured with a table indicating the sidelink capabilities associated with a signaled repeater class. Accordingly, the sidelink UE 115 may be configured to identify or determine the capabilities of the repeater 110 based on the indicated repeater class.

In some aspects, the sidelink capability report may include or indicate a subset of the capabilities described above with respect to FIG. 3. For example, the sidelink capability report may include or indicate capabilities related to sidelink communication (PC5), but may include fewer capabilities, or no capabilities, for Uu communications. In some aspects, the capability report may be based on a Uu connection status with the BS 105 and the network. For example, if the repeater 110 is connected and registered with the network, the capability report may include or indicate the repeater's 110 Uu repeating capabilities and/or Uu communication capabilities with the network. For example, if the repeater 110 is still connected to the network, the capability report may indicate a capability for relaying data traffic to the BS 105 and the network. If the repeater 110 is in idle mode, or no longer connected to the network, the capability report may indicate only sidelink repeating capabilities, and may not indicate Uu communication capabilities.

In some aspects, the transmission of the sidelink capability report in action 406 may be triggered by, or based on, receiving authentication or verification from the network and/or from the sidelink UE 115. For example, the transmission of the sidelink capability report may be based on receiving authentication from the higher layers of the protocol stack (e.g., DU, CU, CN) of the network, or the higher layers (e.g., NAS) of the sidelink UE 115.

At action 408, the sidelink UE 115 determines, based on the sidelink capability report, a sidelink repeater configuration for the repeater 110. In some aspects, the sidelink repeating configuration may indicate parameters or configurations for PC5 repeating operation. In some aspects, the sidelink repeating configuration may indicate on and/or off time periods for repeating operations. For example, the sidelink repeating configuration may indicate semi-static time resources (e.g., frames, slots, sub-slots, symbols, etc.) at which the repeater 110 will be "on" and performing sidelink repeating operations. In another aspect, the sidelink repeating configuration may indicate frequency carriers, BWPs, and/or other frequency resources for sidelink communication, Uu communication, and/or both sidelink communication and Uu communication. In some aspects, the sidelink repeating configuration may one or more beam directions for receiving sidelink signals from the sidelink UE 115 and/or from other sidelink UEs. In another aspect, the sidelink repeating configuration may indicate one or more beam directions for transmitting Uu and/or sidelink communications. In another aspect, the sidelink repeating configuration may indicate a transmit power configuration for the repeater 110. For example, the sidelink repeating configuration may indicate a maximum power and/or a power split for each of a plurality of carriers (e.g., a maximum power for each of the plurality of carriers and/or an aggregate maximum power across the plurality of carriers). The transmit power may be specific to sidelink communications or Uu communications, or may be common for Uu and sidelink communications.

At action 410, the sidelink UE 115 transmits, and the repeater 110 receives, the sidelink repeater configuration. In some aspects, transmitting the sidelink repeater configuration comprises transmitting a RRC message indicating the configuration. In other aspects, transmitting the sidelink repeater configuration comprises transmitting a media access control-control element (MAC-CE) and/or a MAC protocol data unit (PDU) indicating the configuration. In some aspects, the sidelink UE 115 may transmit the sidelink repeater configuration in a shared channel. For example, the sidelink UE 115 may transmit the configuration in a PSSCH, PSCCH, and/or any other suitable channel.

At action 412, the repeater 110 forwards a communication to the sidelink UE 115. In some aspects, action 412 includes performing an amplify-and-forward (AF) operation. In some aspects, the repeater 110 decodes and forwards the communication to the sidelink UE 115. In some aspects, the communication 414 may include or indicate sidelink data and/or control information intended for the sidelink UE 115. In some aspects, the repeater 110 may receive sidelink data from a different sidelink UE, and forward the sidelink communication to the sidelink UE 115.

Figure 5:
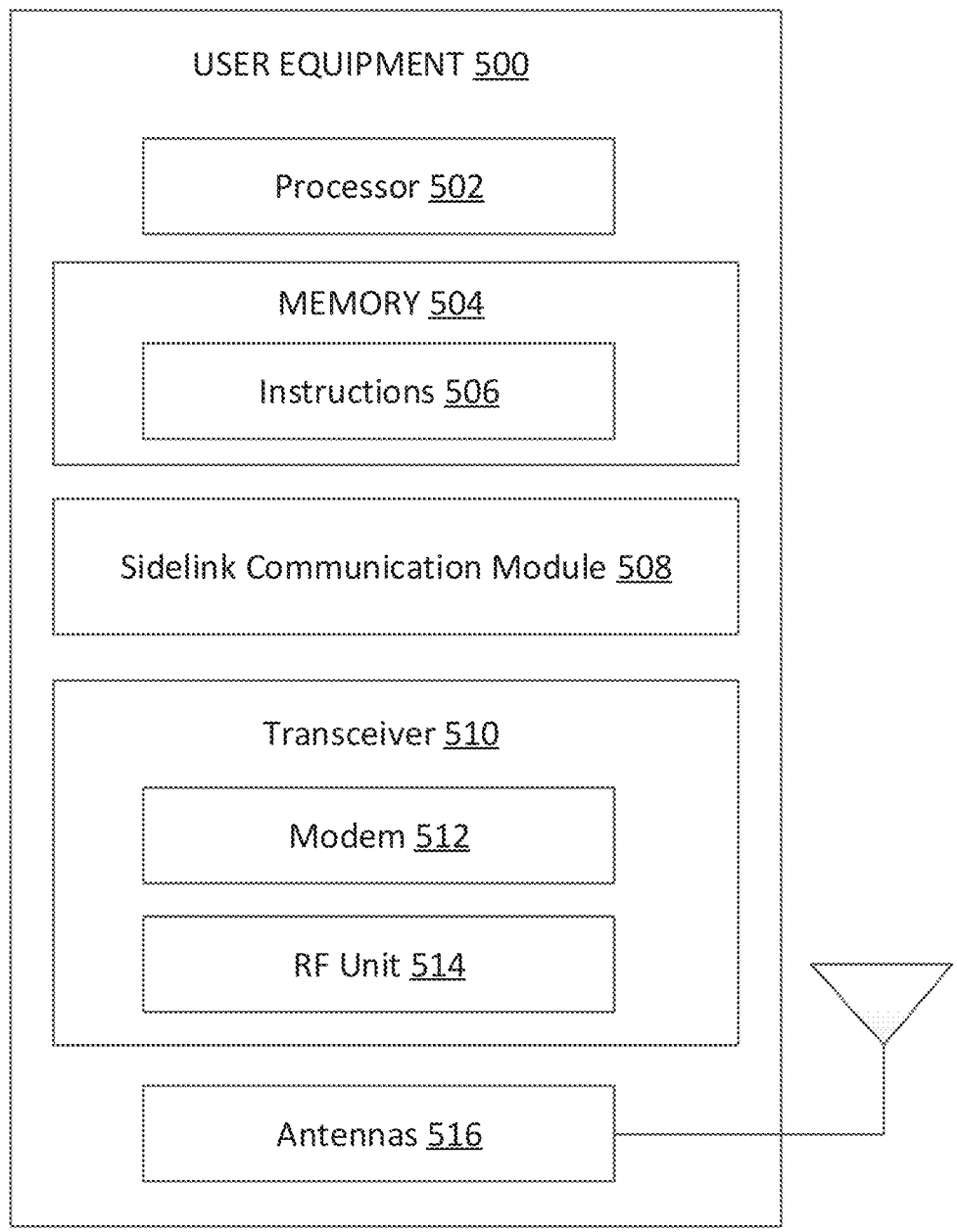
FIG. 5 is a block diagram of a wireless repeater device according to some aspects of the present disclosure.

FIG. 5 is a block diagram of an exemplary UE 500 according to some aspects of the present disclosure. The UE 500 may be a UE 115 discussed above in FIG. 1. In some aspects, the UE 500 is configured for sidelink communication, such as one of the UEs 215 discussed above in FIGS. 2A-2C. In another aspect, the UE 500 may be a controlling sidelink node, such as the node 207 discussed above in FIGS. 2B 2C, and/or the sidelink UE 115 described with respect to FIG. 4. As shown, the UE 500 may include a processor 502, a memory 504, an sidelink communication module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 6-13. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The sidelink communication module 508 may be implemented via hardware, software, or combinations thereof. For example, the sidelink communication module 508 may be implemented as a processor, circuit, and/or instructions 506 stored in the memory 504 and executed by the processor 502. In some instances, the sidelink communication module 508 can be integrated within the modem subsystem 512. For example, the sidelink communication module 508 can be implemented by a combination of software components (e.g., executed by a DSP or a general processor) and hardware components (e.g., logic gates and circuitry) within the modem subsystem 512.

The sidelink communication module 508 may be used for various aspects of the present disclosure, for example, aspects of FIGS. 2A-4. The sidelink communication module 508 is configured to transmit a sidelink repeating configuration to a repeater, relay device, or assisting node (AN) based on a signaled sidelink capability report from the repeater. For example, in some aspects, the sidelink communication module 508 is configured to receive, from the repeater, a connection request. The connection request may be received as part of a sidelink discovery procedure, in some aspects. The sidelink communication module 508 may be further configured to receive, from the repeater, a sidelink capability report indicating sidelink repeating capabilities of the repeater. For example, the sidelink capability report may indicate the ability of the repeater to receive, forward, and/or decode communications between sidelink UEs, (PC5 communication link) and/or between a UE and the network (Uu communication link). The sidelink capability report may further indicate one or more beam capabilities or configurations for the repeater. In some aspects, the report indicates how many channels (e.g., PSFCH, PSCCH) the repeater can simultaneously decode, receive, and/or transmit.

In another aspect, the sidelink communication module 508 is configured to transmit a sidelink repeating configuration to the repeater. The sidelink repeating configuration may be based on the sidelink capability report from the repeater. In this regard, the sidelink repeating configuration may facilitate operation of the repeater in a way that takes advantage of the repeater's capabilities in the sidelink network.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504 and/or the sidelink communication module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., PSSCH data and/or PSCCH control information, COT sharing SCI, HARQ ACK/NACK) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., PSSCH data and/or PSCCH control information, PSFCH feedback information, SCI, HARQ ACK/NACK) to the sidelink communication module 508 for processing. The antennas 516 may include multiple antennas of similar or different designs in order to sustain multiple transmission links. The RF unit 514 may configure the antennas 516.

In an example, the transceiver 510 is configured to transmit PSSCH data, PSCCH SCI, sidelink COT sharing SCI, sidelink scheduling SCI, and/or physical sidelink feedback channel (PSFCH) ACK/NACK feedbacks to another UE and/or receive PSSCH data, PSCCH SCI, sidelink COT sharing SCI, sidelink scheduling SCI, and/or PSFCH ACK/NACK feedbacks from another UE, for example, by coordinating with the sidelink communication module 508.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
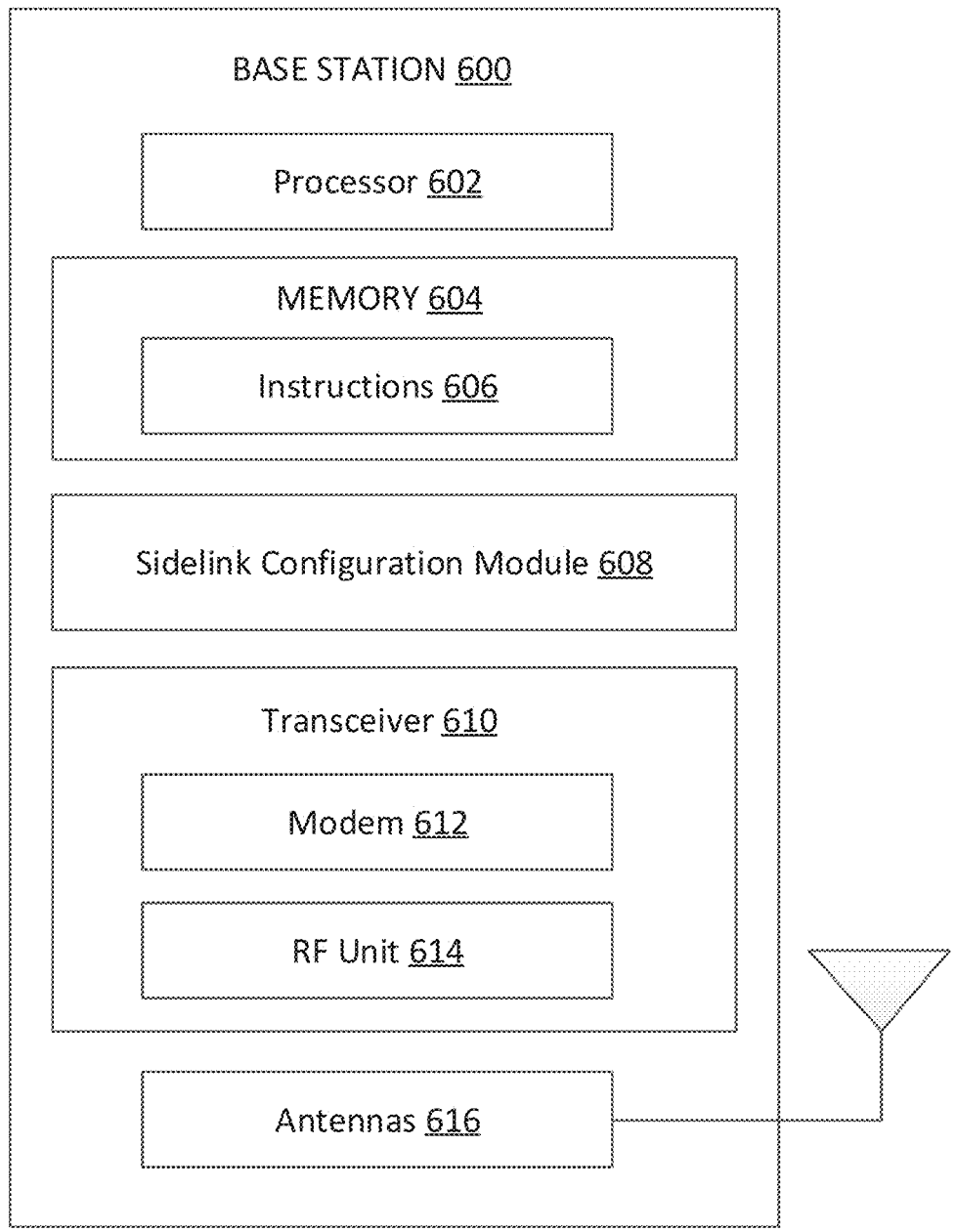
FIG. 6 is a block diagram of a user equipment (UE) according to some aspects of the present disclosure.

FIG. 6 is a block diagram of an exemplary BS 600 according to some aspects of the present disclosure. The BS 600 may be a BS 105 in the network 100 as discussed above in FIG. 1. As shown, the BS 600 may include a processor 602, a memory 604, an sidelink configuration module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 6-10. Instructions 606 may also be referred to as code, which may be interpreted broadly to include any type of computer-readable statement(s) as discussed above with respect to FIG. 4.

The sidelink configuration module 608 may be implemented via hardware, software, or combinations thereof. For example, the sidelink configuration module 608 may be implemented as a processor, circuit, and/or instructions 606 stored in the memory 604 and executed by the processor 602. In some instances, the sidelink configuration module 608 can be integrated within the modem subsystem 612. For example, the sidelink configuration module 608 can be implemented by a combination of software components (e.g., executed by a DSP or a general processor) and hardware components (e.g., logic gates and circuitry) within the modem subsystem 612.

The sidelink configuration module 608 may be used for various aspects of the present disclosure, for example, aspects of FIGS. 2A-4. The sidelink configuration module 608 is configured to transmit a sidelink repeating configuration to a repeater, relay device, or assisting node (AN) based on a signaled sidelink capability report from the repeater. For example, in some aspects, the sidelink configuration module 608 is configured to receive, from the repeater, a connection request. The connection request may be received as part of a sidelink discovery procedure, in some aspects. The sidelink configuration module 608 may be further configured to receive, from the repeater, a sidelink capability report indicating sidelink repeating capabilities of the repeater. For example, the sidelink capability report may indicate the ability of the repeater to receive, forward, and/or decode communications between sidelink UEs, (PC5 communication link) and/or between a UE and the network (Uu communication link). The sidelink capability report may further indicate one or more beam capabilities or configurations for the repeater. In some aspects, the report indicates how many channels (e.g., PSFCH, PSCCH) the repeater can simultaneously decode, receive, and/or transmit.

In another aspect, the sidelink configuration module 608 is configured to transmit a sidelink repeating configuration to the repeater. The sidelink repeating configuration may be based on the sidelink capability report from the repeater. In this regard, the sidelink repeating configuration may facilitate operation of the repeater in a way that takes advantage of the repeater's capabilities in the sidelink network.

As shown, the transceiver 610 may include the modem subsystem 612 and the RF unit 614. The transceiver 610 can be configured to communicate bi-directionally with other devices, such as the UEs 115 and/or 500 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., a sidelink resource configuration, sidelink COT sharing configuration) from the modem subsystem 612 (on outbound transmissions) or of transmissions originating from another source such as a UE 115 and/or UE 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to some aspects of the present disclosure. The antennas 616 may further receive data messages transmitted from other devices and provide the received data messages for processing and/or demodulation at the transceiver 610. The transceiver 610 may provide the demodulated and decoded data (e.g., a sidelink resource configuration request, a sidelink COT sharing request) to the sidelink configuration module 608 for processing. The antennas 616 may include multiple antennas of similar or different designs in order to sustain multiple transmission links.

In an example, the transceiver 610 is configured to transmit a resource configuration to a UE (e.g., the UEs 115 and 400) indicating a frequency interlace and receive a UL control channel signal (e.g., a PUCCH signal) modulated by HARQ ACK/NACK and SR from the UE in the frequency interlace, for example, by coordinating with the sidelink configuration module 608.

In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

Figure 7:
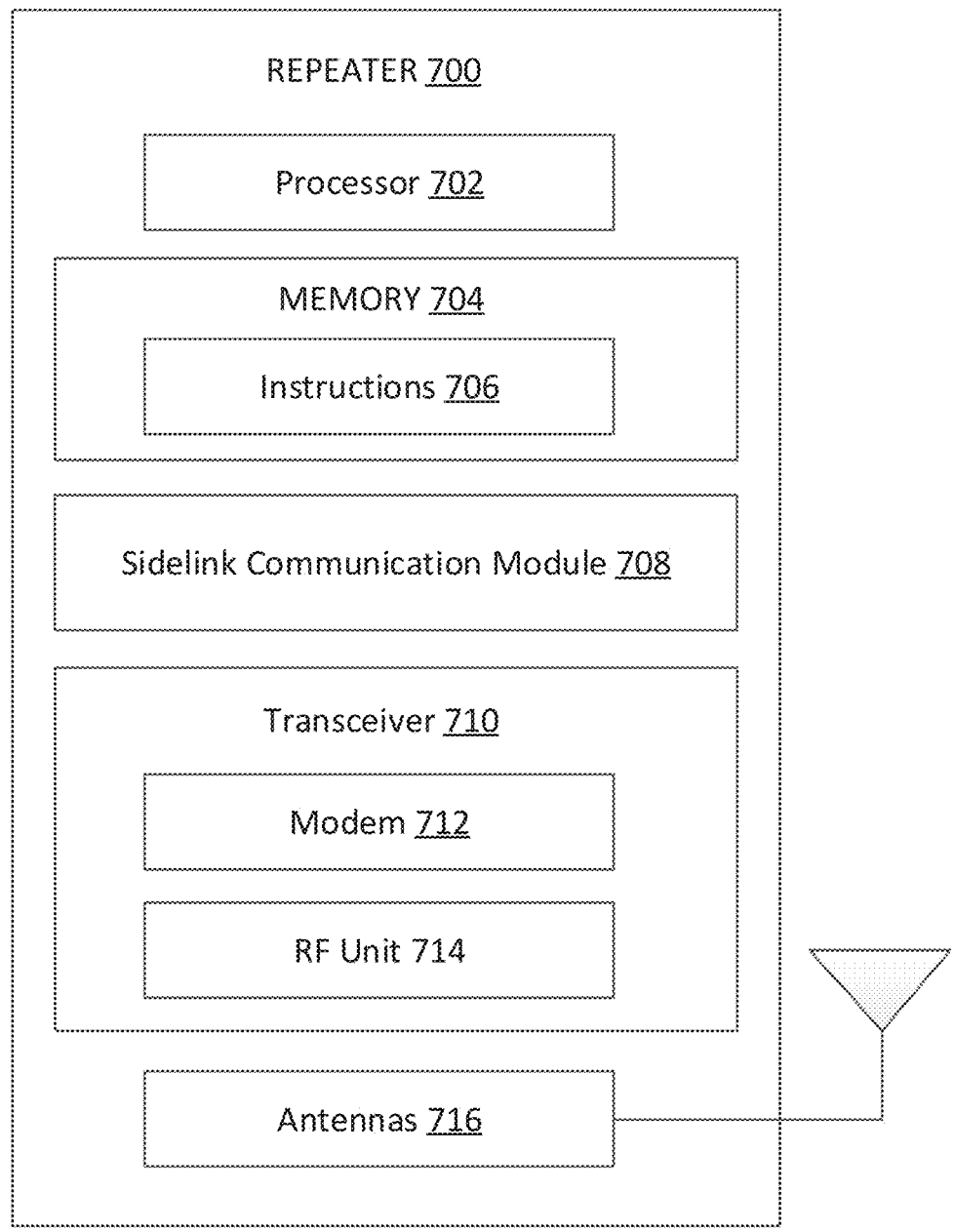
FIG. 7 is a block diagram of an exemplary base station (BS) according to some aspects of the present disclosure.

FIG. 7 is a block diagram of an exemplary repeater 700 according to some aspects of the present disclosure. The repeater 700 may be a repeater 110 in the network 100 as discussed above in FIG. 1. A shown, the repeater 700 may include a processor 702, a memory 704, an sidelink communication module 708, a transceiver 710 including a modem subsystem 712 and a RF unit 714, and one or more antennas 716. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 7-10. Instructions 706 may also be referred to as code, which may be interpreted broadly to include any type of computer-readable statement(s) as discussed above with respect to FIG. 4.

The sidelink communication module 708 may be implemented via hardware, software, or combinations thereof. For example, the sidelink communication module 708 may be implemented as a processor, circuit, and/or instructions 706 stored in the memory 704 and executed by the processor 702. In some instances, the sidelink communication module 708 can be integrated within the modem subsystem 712. For example, the sidelink communication module 708 can be implemented by a combination of software components (e.g., executed by a DSP or a general processor) and hardware components (e.g., logic gates and circuitry) within the modem subsystem 712.

The sidelink communication module 708 may be used for various aspects of the present disclosure, for example, aspects of FIGS. 2A-4. The sidelink communication module 708 is configured to signal a sidelink repeating capability to a second wireless communication device, such as the BS 600 and/or the UE 500, and to receive a sidelink repeating capability based on the report. For example, the sidelink communication module 708 may be configured to initiate a registration protocol for performing repeater operations in a sidelink network. In some aspects, initiating the registration protocol includes performing a RACH protocol to connect to the network. In other aspects, initiating the registration protocol includes performing a sidelink discovery procedure. The sidelink communication module 708 may also be configured to transmit, to the second wireless communication device, a sidelink capability report indicating sidelink repeating capabilities of the first wireless communication device. For example, the sidelink capability report may indicate the ability of the repeater 700 to receive, forward, and/or decode communications between sidelink UEs, (PC5 communication link) and/or between a UE and the network (Uu communication link). The sidelink capability report may further indicate one or more beam capabilities or configurations for the repeater 700. In some aspects, the report indicates how many channels (e.g., PSFCH, PSCCH) the repeater 700 can simultaneously decode, receive, and/or transmit.

In another aspect, the sidelink communication module 708 is configured to receive a sidelink repeating configuration from the second wireless communication device. The sidelink repeating configuration may be based on the sidelink capability report. In this regard, the sidelink repeating configuration may facilitate operation of the repeater 700 in a way that takes advantage of the repeater's capabilities in the sidelink network. In another aspect, the sidelink communication module 708 is configured to communicate a first signal based on the sidelink repeating configuration. In some aspects, the sidelink communication module 708 is configured to receive and/or transmit the first signal from or to another wireless communication device, such as the second wireless communication device. For example, the sidelink communication module 708 may be configured to receive, from a third wireless communication device, a first sidelink signal, and forward the first sidelink signal to the second wireless communication device. In another example, the sidelink communication module 708 may be configured to receive, from the second wireless communication device, a first signal, and forward the received first signal to a BS. In some aspects, the sidelink communication module 708 may be configured to amplify-and-forward the first signal with no signal decoding. In other aspects, the sidelink communication module 708 may be configured to receive and decode the first signal, and transmit the decoded first signal to another wireless communication device. In some aspects, the first signal may include control information (e.g., SCI-1, SCI-2). In other aspects, the first signal may include sidelink data. For example, the first signal may be carried in a PSSCH.

As shown, the transceiver 710 may include the modem subsystem 712 and the RF unit 714. The transceiver 710 can be configured to communicate bi-directionally with other devices, such as the UEs 115 and/or 400 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., a sidelink resource configuration, sidelink COT sharing configuration) from the modem subsystem 712 (on outbound transmissions) or of transmissions originating from another source such as a UE 115 and/or UE 400. The RF unit 714 may be further configured to perform analog beamforming in conjunction with the digital beamforming. Although shown as integrated together in transceiver 710, the modem subsystem 712 and/or the RF unit 714 may be separate devices that are coupled together at the repeater 105 to enable the repeater 105 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, transmission of information to complete attachment to a network and communication with a camped UE 115 or 400 according to some aspects of the present disclosure. The antennas 716 may further receive data messages transmitted from other devices and provide the received data messages for processing and/or demodulation at the transceiver 710. The transceiver 710 may provide the demodulated and decoded data (e.g., a sidelink resource configuration request, a sidelink COT sharing request) to the sidelink communication module 708 for processing. The antennas 716 may include multiple antennas of similar or different designs in order to sustain multiple transmission links.

In an aspect, the repeater 700 can include multiple transceivers 710 implementing different RATs (e.g., NR and LTE). In an aspect, the repeater 700 can include a single transceiver 710 implementing multiple RATs (e.g., NR and LTE). In an aspect, the transceiver 710 can include various components, where different combinations of components can implement different RATs.

Figure 8:
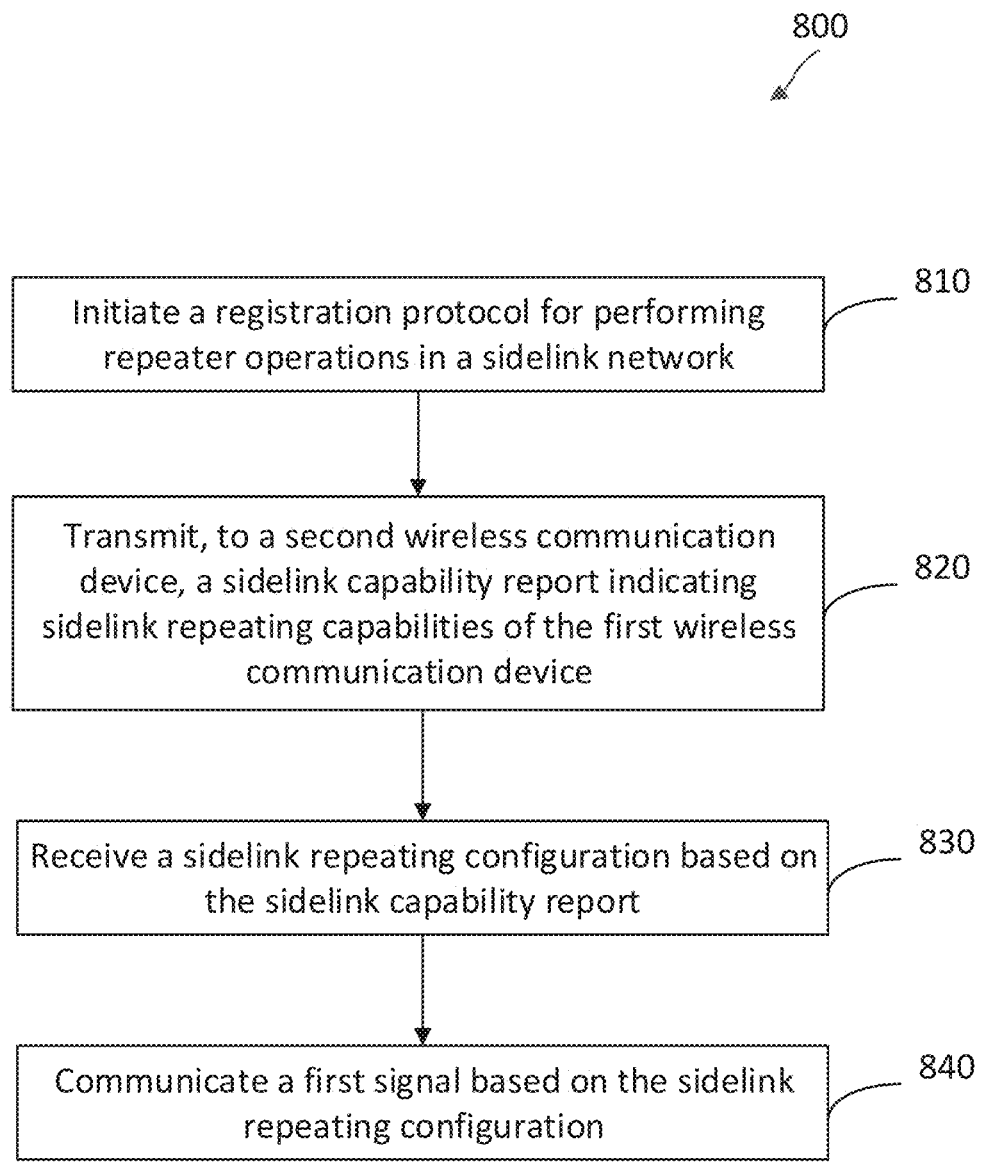
FIG. 8 is a flow diagram of a sidelink communication method according to some aspects of the present disclosure.

FIG. 8 is a flow diagram of a sidelink communication method 800 according to some aspects of the present disclosure. Steps of the method 800 can be executed by a computing device (e.g., a processor, processing circuit, and/or other suitable component) of a wireless communication device or other suitable means for performing the steps. For example, a wireless communication device, such as a relay device or repeater, may be configured to perform the steps of the method 800. In some aspects, the repeater may include one of the repeaters 209 in the networks 200b, 200c, or the repeater 700. Other aspects of the method 800 may be performed by a UE, such as one of the UEs 115, 215, 500, described above. In one example, the repeater 700, may utilize one or more components, such as the processor 502, the memory 504, the sidelink communication module 508, the transceiver 510, the modem 512, and the one or more antennas 516, to execute the steps of method 800. The method 800 may employ similar mechanisms as in the methods 300, 400 described above with respect to FIGS. 3 and 4, respectively. As illustrated, the method 800 includes a number of enumerated steps, but aspects of the method 800 may include additional steps before, after, and in between the enumerated steps. In some aspects, one or more of the enumerated steps may be omitted or performed in a different order.

At step 810, the method 800 includes a first wireless communication device initiating a registration protocol for performing repeater operations in a sidelink network. In some aspects, initiating the registration protocol may include performing a cell search and/or initial access procedure for example. In some aspects, initiating the registration protocol may include performing a random access procedure and establishing a radio resource control (RRC) connection status with a base station (BS) or other wireless communication device. For example, step 810 may include receiving system information from the BS (e.g., MIB, SIB1), transmitting a RACH preamble, receiving a RACH response, transmitting a RRC Setup Request message, receiving a RRC Setup message, transmitting a RRC Setup Complete message, and requesting NAS Registration. In some aspects step 810 may include transmitting the message in a PUCCH, PUSCH, PSSCH, PSCCH, and/or any other suitable channel Step 810 may further include additional NAS registration, UE capability signaling, and/or registration completion acknowledgement procedures.

In other aspects, initiating the registration protocol for performing repeater operations may include performing a sidelink discovery procedure. For example, the first wireless communication device may signal its presence to a second wireless communication device, and the second wireless communication device may signal its presence to the first wireless communication device. The sidelink discovery procedure may further include transmitting and/or receiving sidelink control information (SCI) to or from the second wireless communication device. The sidelink discovery procedure may include communicating in a physical sidelink discovery channel (PSDCH), for example. In other aspects, the discovery procedure may include communicating in a sidelink shared channel (PSSCH), a sidelink control channel (PSCCH), and/or any other suitable channel. In some aspects, the sidelink discovery procedure may further include transmitting or signaling an identity of the first wireless communication device, and/or receiving a signal indicating an identity of another sidelink UE.

In some aspects, step 810 may further include the first wireless communication device transmitting, to a second wireless communication device, one or more repeater configurations and/or capabilities. For example, the first wireless communication device may transmit, to a base station, a signal indicating that the first wireless communication device supports repeating for sidelink (PC5) and/or Uu communication links. In some aspects, the method 800 may further include the first wireless communication device receiving a signal authorizing the first wireless communication device to perform sidelink repeating operations during the registration protocol. In some aspects, the first wireless communication device is configured to share the sidelink configurations or capabilities described above in response to receiving a request from a network, for example via a BS.

The registration protocol may include messages communicated between the second wireless communication device and various protocol stacks of the network and their associated components and equipment, including distributed units (DU), central units (CU), and/or the core network (CN).

At step 820, the first wireless communication device transmits, to a second wireless communication device, a sidelink capability report. The sidelink capability report may indicate sidelink repeating capabilities of the first wireless communication device. In some aspects, step 820 includes transmitting, to the second wireless communication device, a RRC message. For example, step 820 may include the first wireless communication device transmitting a RepeaterCapabilitySidelink RRC message. In another example, if the second wireless communication device is a sidelink communication device (e.g., sidelink UE), step 820 may include transmitting a PC5RepeaterCapabilitySidelink message. In some aspects, the first wireless communication device transmits the sidelink capability report in response to being registered to the second wireless communication device, or to a network associated with the second wireless communication device.

The sidelink capability report may include or indicate one or more capabilities of the first wireless communication device associated with repeating operations and/or sidelink communications. For example, the sidelink capability report may include or indicate a sidelink synchronization signal block (S-SSB) capability. The S-SSB capability may include or indicate the first wireless communication device's capability to transmit and/or receive a S-SSB. In some aspects, the S-SSB capability may include or indicate the first wireless communication device's capability to decode and/or amplify and forward a S-SSB. For example, the sidelink capability report may indicate that the first wireless communication device is configured to receive, but not transmit, a S-SSB. In another example, the sidelink capability report may indicate that the first wireless communication device is configured to receive, decode, and transmit a S-SSB. In other examples, the sidelink capability report may indicate that the first wireless communication device is configured only to amplify-and-forward (AF) an S-SSB. Other SSB Tx/Rx capabilities may also be included in the sidelink capability report.

In another aspect, the sidelink capability report may include or indicate the first wireless communication device's capability for physical sidelink control channel (PSCCH) decoding. For example, the sidelink capability report may indicate whether the first wireless communication device is configured to decode a PSCCH, or is only configured for AF of the PSCCH. In another aspect, the sidelink capability report may indicate how many PSCCH decodings and/or transmissions the first wireless communication device can perform within a slot. In another aspect, the sidelink capability report may include or indicate the first wireless communication device's capability for physical sidelink shared channel (PSSCH) decoding. For example, the sidelink capability report may indicate whether the first wireless communication device is configured to decode a PSSCH, or is only configured for AF of the PSSCH. In another aspect, the sidelink capability report may indicate how many PSSCH decodings and/or transmissions the first wireless communication device can perform within a slot. In another aspect, the sidelink capability report may indicate a number of SCI-2 the first wireless communication device can transmit and/or receive in a slot. In another aspect, the sidelink capability report may indicate whether the first wireless communication device is configured to decode SCI. In another aspect, the sidelink capability report may include or indicate the first wireless communication device's capability for physical sidelink feedback channel (PSFCH) decoding. For example, the sidelink capability report may indicate whether the first wireless communication device is configured to decode a PSFCH, or is only configured for AF of the PSFCH. In another aspect, the sidelink capability report may indicate the number of PSFCH the first wireless communication device can simultaneously receive and/or decode. In some aspects, the sidelink capability report may indicate that the first wireless communication device is configured to simultaneously transmit M PSFCH communications. In another aspect, the sidelink capability report may indicate that the first wireless communication device is configured to simultaneously receive N PSFCH communications.

In another aspect, the sidelink capability report may include or indicate beam capabilities of the first wireless communication device. For example, the sidelink capability report may indicate a number of radiofrequency Tx/Rx panels or antennas that can be used for sidelink transmission. In another aspect, the sidelink capability report may indicate a number of simultaneous transmit/receive beams that can be used for sidelink communication and/or Uu communication with a BS and/or UE. In another aspect, the sidelink capability report may indicate a power class associated with the first wireless communication device. For example, the sidelink communication report may indicate a transmit power class of the first wireless communication device. In another aspect, the sidelink capability report may indicate a frequency granularity of the first wireless communication device. For example, the sidelink capability report may indicate a frequency-selective amplify-and-forward granularity. In another aspect, the sidelink capability report may indicate AF operation for each carrier and/or for each bandwidth part (BWP). In another aspect, the sidelink capability report may indicate AF decoding/processing capabilities for one or more carriers, including a combination or set of carriers. In another aspect, the sidelink capability report may indicate a carrier capability of the first wireless communication device. For example, the sidelink capability report may indicate whether the first wireless communication device is configured for simultaneous operation on Uu and PC5 communication links. Further, the sidelink capability report may indicate whether the first wireless communication device is configured to switch between carriers. The sidelink capability report may indicate a switching delay associated with switching between the carriers. In some aspects, the sidelink capability report may indicate a sensing or measuring capability of the first wireless communication device. For example, the sidelink capability report may indicate whether the first wireless communication device is configured for spectrum sensing or energy detection for autonomous PC5 operation. In another aspect, the sidelink capability report may indicate whether the first wireless communication device is configured to measure reference signal reserve power (RSRP), received signal strength indicator (RSSI), and/or channel busy ratio (CBR) of sidelink signals and channels. In another aspect, the sidelink capability report may indicate the first wireless communication device's capability for SL-CSI-RS transmission and/or reception.

In some aspects, the sidelink capability report may indicate a class or category of repeater. Each class or category of repeater may be associated with one or more of the capabilities described above. For example, the sidelink capability report may indicate a first repeater class associated with a first S-SSB capability, a first decoding (e.g., PSCCH, PSSCH, and/or PSFCH) capability, a first beam capability, a first power class, a first frequency capability, a first frequency granularity, and/or a first sensing measurement capability. In some aspects, the first repeater class may indicate, for example, that AF operation is used for all sidelink channels. In another example, the repeater class may indicate that the first wireless communication device is configured to simultaneously receive and decode M PSFCH, and simultaneously transmit N PSFCH. For example, the second wireless communication device receiving the sidelink capability report may be configured with a table indicating the sidelink capabilities associated with a signaled repeater class. Accordingly, the second wireless communication device may be configured to identify or determine the capabilities of the first wireless communication device based on the indicated repeater class.

At step 830, the first wireless communication device receives a sidelink repeating configuration. The sidelink repeating configuration may be based on the sidelink capability report transmitted at step 820. In some aspects, the sidelink repeating configuration may indicate parameters or configurations for PC5 repeating operation. In some aspects, the sidelink repeating configuration may indicate on and/or off time periods for repeating operations. For example, the sidelink repeating configuration may indicate semi-static time resources (e.g., frames, slots, sub-slots, symbols, etc.) at which the first wireless communication device will be "on" and performing sidelink repeating operations. In another aspect, the sidelink repeating configuration may indicate frequency carriers, BWPs, and/or other frequency resources for sidelink communication, Uu communication, and/or both sidelink communication and Uu communication. In some aspects, the sidelink repeating configuration may indicate one or more beam directions for receiving Uu communications (e.g., from the BS). In another aspect, the sidelink repeating configuration may indicate one or more beam directions for receiving sidelink signals. In another aspect, the sidelink repeating configuration may indicate one or more beam directions for transmitting Uu and/or sidelink communications. In another aspect, the sidelink repeating configuration may indicate a transmit power configuration for the first wireless communication device. For example, the sidelink repeating configuration may indicate a maximum power and/or a power split for each of a plurality of carriers (e.g., a maximum power for each of the plurality of carriers and/or an aggregate maximum power across the plurality of carriers). The transmit power may be specific to sidelink communications or Uu communications, or may be common for Uu and sidelink communications.

At step 840, the first wireless communication device communicates a first signal based on the sidelink repeating configuration received at step 830. In some aspects, step 840 may include receiving and/or transmitting the first signal from or to another wireless communication device, such as the second wireless communication device. For example, step 840 may include receiving, from a third wireless communication device, a first sidelink signal, and forwarding the first sidelink signal to the second wireless communication device. In another example, step 840 may include receiving, from the second wireless communication device, a first signal, and forwarding the received first signal to a BS. In some aspects, step 840 may include an amplify-and-forward communication with no signal decoding. In other aspects, step 840 may include receiving and decoding the first signal, and transmitting the decoded first signal to another wireless communication device. As explained above, the first wireless communication device may be used according to different sidelink architectures or modes, for example in an IIOT scenario. In this regard, the first wireless communication device may be configured as a repeater or assisting node for relaying communications between a base station and a controlling sidelink node. In other aspects, the first wireless communication device may be configured to relay communications between one or more sidelink UEs and the sidelink controlling UE. In some aspects, the first signal may include control information (e.g., SCI-1, SCI-2). The first signal may include information carried in a PSCCH, for example. In other aspects, the first signal may include sidelink data. For example, the first signal may be carried in a PSSCH.

According to the method 800 described above, the first wireless communication device may communicate the first signal with a configuration that accommodates the capabilities of the first wireless communication device. In some aspects, the method 800 described above may allow for a more beneficial use of the first wireless communication device as a repeater or assisting node. By making known to the sidelink controlling node, and/or to the network, the capabilities of the repeater, the architecture and operational mode of the first wireless communication device may be configured and established to obtain more optimal benefits from first wireless communication device.

Figure 9:
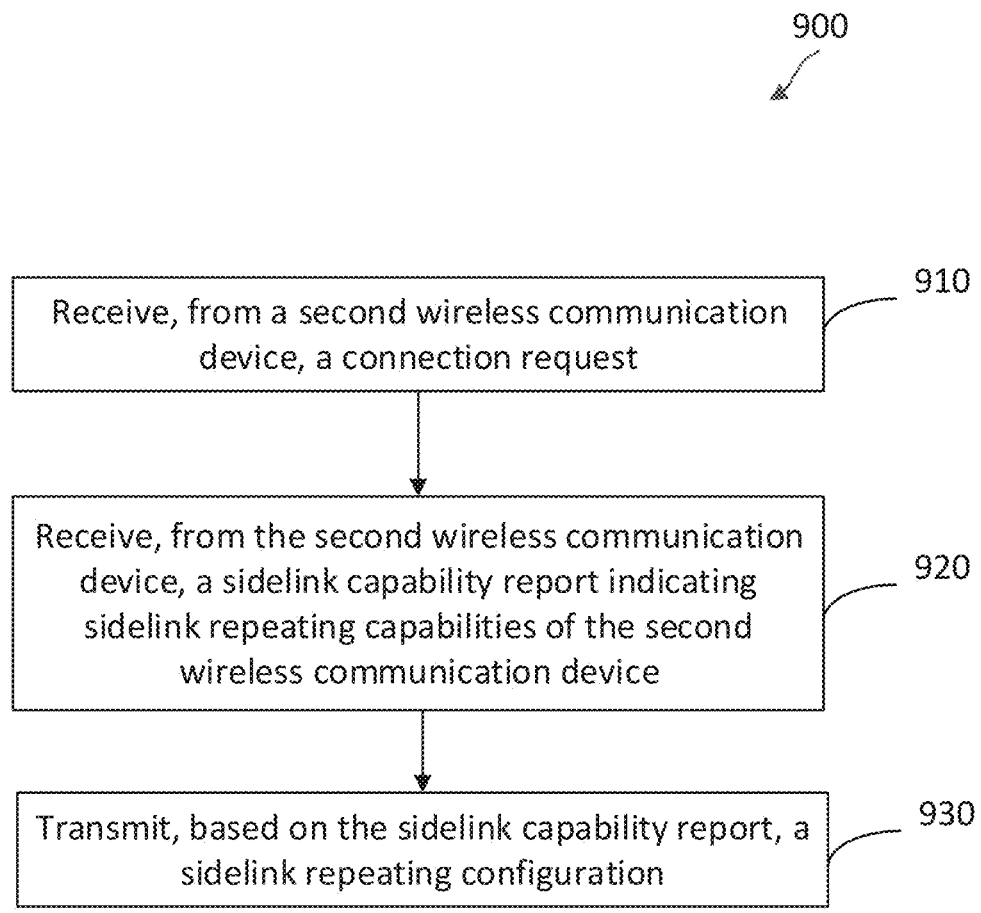
FIG. 9 is a flow diagram of a sidelink communication method according to some aspects of the present disclosure.

FIG. 9 is a flow diagram of a sidelink method 900 according to some aspects of the present disclosure. Steps of the method 900 can be executed by a computing device (e.g., a processor, processing circuit, and/or other suitable component) of a wireless communication device or other suitable means for performing the steps. In one aspect, a wireless communication device, such as a sidelink UE 115, 215, or 500, may utilize one or more components, such as the processor 602, the memory 604, the sidelink configuration module 608, the transceiver 610, the modem 612, and the one or more antennas 616, to execute the steps of method 900. For example, one or more steps of the method 900 may be performed by a controlling sidelink UE or sidelink node, such as the node 207. In another aspect, a BS, such as one of the BSs 105, 205, or 600 may utilize one or more components, such as the processor 702, the memory 704, the sidelink communication module 708, the transceiver 710, the modem 712, and the one or more antennas 716, to execute the steps of method 900. The method 900 may employ similar mechanisms as in the methods 300, and/or 400 described above with respect to FIGS. 2A, 2B, 2C, 3, and/or 4. As illustrated, the method 900 includes a number of enumerated steps, but aspects of the method 900 may include additional steps before, after, and in between the enumerated steps. In some aspects, one or more of the enumerated steps may be omitted or performed in a different order.

At step 910, the method 900 includes a first wireless communication device receiving, from a second wireless communication device, a connection request. In some aspects, the connection request indicates a request for the second wireless communication device to perform repeater operations in a sidelink network. In some aspects, receiving the connection request may be part of a cell search and/or initial access procedure. In some aspects, step 910 may include performing a random access procedure and establishing a radio resource control (RRC) connection status with a UE or other wireless communication device. For example, in some aspects, the first wireless communication device may transmit system information to the second wireless communication device (e.g., MIB, SIB1), receive a RACH preamble, transmit a RACH response, receive a RRC Setup Request message, transmit a RRC Setup message, receive a RRC Setup Complete message, and receiving NAS Registration indication. Step 910 may further include additional NAS registration, UE capability signaling, and/or registration completion acknowledgement procedures.

In other aspects, step 910 may include performing a sidelink discovery procedure. For example, the first wireless communication device may signal its presence to a second wireless communication device, and the second wireless communication device may signal its presence to the first wireless communication device. The sidelink discovery procedure may further include transmitting and/or receiving sidelink control information (SCI) to or from the second wireless communication device. The sidelink discovery procedure may include communicating in a physical sidelink discovery channel (PSDCH), for example. In some aspects, the sidelink discovery procedure may further include transmitting or signaling an identity of the first wireless communication device, and/or receiving a signal indicating an identity of the second wireless communication device.

In some aspects, step 910 may further include the first wireless communication device receiving, from the second wireless communication device, one or more repeater configurations and/or capabilities. For example, the first wireless communication device may receive, from the second wireless communication device, a signal indicating that the second wireless communication device supports repeating for sidelink (PC5) and/or Uu communication links. In some aspects, the method 900 may further include the first wireless communication device transmitting a signal authorizing the second wireless communication device to perform sidelink repeating operations during the registration protocol.

The registration protocol may include messages communicated between the first wireless communication device and various protocol stacks of the network and their associated components and equipment, including distributed units (DU), central units (CU), and/or the core network (CN).

At step 920, the first wireless communication device receives, from the second wireless communication device, a sidelink capability report. The sidelink capability report may indicate sidelink repeating capabilities of the second wireless communication device. In some aspects, step 920 includes receiving, from the second wireless communication device, a RRC message. For example, step 920 may include the first wireless communication device receiving a RepeaterCapabilitySidelink RRC message. In another example, if the first wireless communication device is a sidelink communication device (e.g., sidelink UE), step 920 may include receiving a PC5RepeaterCapabilitySidelink message. In some aspects, the first wireless communication device receives the sidelink capability report in response to the second wireless communication device being registered to the first wireless communication device, or to a network associated with the first wireless communication device.

The sidelink capability report may include or indicate one or more capabilities of the second wireless communication device associated with repeating operations and/or sidelink communications. For example, the sidelink capability report may include or indicate a sidelink synchronization signal block (S-SSB) capability. The S-SSB capability may include or indicate the second wireless communication device's capability to transmit and/or receive a S-SSB. In some aspects, the S-SSB capability may include or indicate the second wireless communication device's capability to decode and/or amplify and forward a S-SSB. For example, the sidelink capability report may indicate that the second wireless communication device is configured to receive, but not transmit, a S-SSB. In another example, the sidelink capability report may indicate that the second wireless communication device is configured to receive, decode, and transmit a S-SSB. In other examples, the sidelink capability report may indicate that the second wireless communication device is configured only to amplify-and-forward (AF) an S-SSB. Other SSB Tx/Rx capabilities may also be included in the sidelink capability report.

In another aspect, the sidelink capability report may include or indicate the second wireless communication device's capability for physical sidelink control channel (PSCCH) decoding. For example, the sidelink capability report may indicate whether the second wireless communication device is configured to decode a PSCCH, or is only configured for AF of the PSCCH. In another aspect, the sidelink capability report may indicate how many PSCCH decodings and/or transmissions the second wireless communication device can perform within a slot. In another aspect, the sidelink capability report may include or indicate the second wireless communication device's capability for physical sidelink shared channel (PSSCH) decoding. For example, the sidelink capability report may indicate whether the second wireless communication device is configured to decode a PSSCH, or is only configured for AF of the PSSCH. In another aspect, the sidelink capability report may indicate how many PSSCH decodings and/or transmissions the second wireless communication device can perform within a slot. In another aspect, the sidelink capability report may indicate a number of SCI-2 the second wireless communication device can transmit and/or receive in a slot. In another aspect, the sidelink capability report may indicate whether the second wireless communication device is configured to decode SCI. In another aspect, the sidelink capability report may include or indicate the second wireless communication device's capability for physical sidelink feedback channel (PSFCH) decoding. For example, the sidelink capability report may indicate whether the second wireless communication device is configured to decode a PSFCH, or is only configured for AF of the PSFCH. In another aspect, the sidelink capability report may indicate the number of PSFCH the second wireless communication device can simultaneously receive and/or decode. In some aspects, the sidelink capability report may indicate that the second wireless communication device is configured to simultaneously transmit M PSFCH communications. In another aspect, the sidelink capability report may indicate that the second wireless communication device is configured to simultaneously receive N PSFCH communications.

In another aspect, the sidelink capability report may include or indicate beam capabilities of the second wireless communication device. For example, the sidelink capability report may indicate a number of radiofrequency Tx/Rx panels or antennas that can be used for sidelink transmission. In another aspect, the sidelink capability report may indicate a number of simultaneous transmit/receive beams that can be used for sidelink communication and/or Uu communication with a BS and/or a UE. In another aspect, the sidelink capability report may indicate a power class associated with the second wireless communication device. For example, the sidelink communication report may indicate a transmit power class of the second wireless communication device. In another aspect, the sidelink capability report may indicate a frequency granularity of the second wireless communication device. For example, the sidelink capability report may indicate a frequency-selective amplify-and-forward granularity. In another aspect, the sidelink capability report may indicate AF operation for each carrier and/or for each bandwidth part (BWP). In another aspect, the sidelink capability report may indicate AF decoding/processing capabilities for one or more carriers, including a combination or set of carriers. In another aspect, the sidelink capability report may indicate a carrier capability of the second wireless communication device. For example, the sidelink capability report may indicate whether the second wireless communication device is configured for simultaneous operation on Uu and PC5 communication links. Further, the sidelink capability report may indicate whether the second wireless communication device is configured to switch between carriers. The sidelink capability report may indicate a switching delay associated with switching between the carriers. In some aspects, the sidelink capability report may indicate a sensing or measuring capability of the second wireless communication device. For example, the sidelink capability report may indicate whether the second wireless communication device is configured for spectrum sensing or energy detection for autonomous PC5 operation. In another aspect, the sidelink capability report may indicate whether the second wireless communication device is configured to measure reference signal reserve power (RSRP), received signal strength indicator (RSSI), and/or channel busy ratio (CBR) of sidelink signals and channels. In another aspect, the sidelink capability report may indicate the second wireless communication device's capability for SL-CSI-RS transmission and/or reception.

In some aspects, the sidelink capability report may indicate a class or category of repeater. Each class or category of repeater may be associated with one or more of the capabilities described above. For example, the sidelink capability report may indicate a first repeater class associated with a first S-SSB capability, a first decoding (e.g., PSCCH, PSSCH, and/or PSFCH) capability, a first beam capability, a first power class, a first frequency capability, a first frequency granularity, and/or a first sensing measurement capability. In some aspects, the first repeater class may indicate, for example, that AF operation is used for all sidelink channels. In another example, the repeater class may indicate that the second wireless communication device is configured to simultaneously receive and decode M PSFCH, and simultaneously transmit N PSFCH. For example, the first wireless communication device receiving the sidelink capability report may be configured with a table indicating the sidelink capabilities associated with a signaled repeater class. Accordingly, the first wireless communication device may be configured to identify or determine the capabilities of the second wireless communication device based on the indicated repeater class.

Step 930, the first wireless communication device transmits a sidelink repeating configuration. The sidelink repeating configuration may be based on the sidelink capability report received at step 920. In some aspects, the sidelink repeating configuration may indicate parameters or configurations for PC5 repeating operation. In some aspects, the sidelink repeating configuration may indicate on and/or off time periods for repeating operations. For example, the sidelink repeating configuration may indicate semi-static time resources (e.g., frames, slots, sub-slots, symbols, etc.) at which the second wireless communication device will be "on" and performing sidelink repeating operations. In another aspect, the sidelink repeating configuration may indicate frequency carriers, BWPs, and/or other frequency resources for sidelink communication, Uu communication, and/or both sidelink communication and Uu communication. In some aspects, the sidelink repeating configuration may indicate one or more beam directions for receiving Uu communications (e.g., from the BS). In another aspect, the sidelink repeating configuration may indicate one or more beam directions for receiving sidelink signals. In another aspect, the sidelink repeating configuration may indicate one or more beam directions for transmitting Uu and/or sidelink communications. In another aspect, the sidelink repeating configuration may indicate a transmit power configuration for the second wireless communication device. For example, the sidelink repeating configuration may indicate a maximum power and/or a power split for each of a plurality of carriers (e.g., a maximum power for each of the plurality of carriers and/or an aggregate maximum power across the plurality of carriers). The transmit power may be specific to sidelink communications or Uu communications, or may be common for Uu and sidelink communications.

In some aspects, the method 900 further includes the first wireless communication device receiving, from the second wireless communication device, a first signal based on the sidelink repeating configuration transmitted at step 930. In some aspects, the first wireless communication device may receive the first signal from another wireless communication device via the second wireless communication device. For example, the second wireless communication device may include a repeater. The first wireless communication device may receive, from a third wireless communication device via the repeater, a first sidelink. In another example, the method 900 may include transmitting, to a third wireless communication device via the second wireless communication device, a first signal.

As explained above, the first wireless communication device may be used according to different sidelink architectures or modes, for example in an IIOT scenario. In this regard, the first wireless communication device may be configured as a controlling sidelink UE. In other aspects, the second wireless communication device may be configured to relay communications between one or more sidelink UEs and the sidelink controlling UE. In some aspects, the first signal may include control information (e.g., SCI-1, SCI-2). In other aspects, the first signal may include sidelink data. For example, the first signal may be carried in a PSSCH.

Example Aspects of the Present Disclosure

Aspect 1. A method of wireless communication performed by a first wireless communication device, comprising: initiating a registration protocol for performing repeater operations for sidelink communications; transmitting, to a second wireless communication device, a sidelink capability report indicating sidelink repeating capabilities of the first wireless communication device; receiving a sidelink repeating configuration based on the sidelink capability report; and communicating a first signal based on the sidelink repeating configuration.

Aspect 2. The method of aspect 1, wherein the second wireless communication device comprises a base station (BS), and wherein the initiating the registration protocol comprises transmitting a registration request to the BS.

Aspect 3. The method of aspect 2, wherein the receiving the sidelink repeating configuration comprises receiving the sidelink repeating configuration from the BS.

Aspect 4. The method of aspect 2, wherein the receiving the sidelink repeating configuration comprises receiving the sidelink repeating configuration from a sidelink user equipment (UE).

Aspect 5. The method of any of aspects 2-4, wherein the sidelink capability report indicates at least one of: a sidelink synchronization signal block decoding capability; a sidelink channel decoding capability; a sidelink beam capability; a power class; a frequency granularity; a simultaneous sidelink and Uu communication capability; a channel sensing capability; or a repeater type index.

Aspect 6. The method of aspect 5, wherein the sidelink capability report indicates at least the sidelink channel decoding capability and the sidelink transmission capability, the sidelink channel decoding capability including one or more of: a sidelink control channel decoding capability; a sidelink data channel decoding capability; a sidelink feedback channel decoding capability; a number of simultaneous decodings for one or more sidelink channels; or a number of simultaneous transmissions for one or more sidelink channels.

Aspect 7. The method of aspect 1, wherein the second wireless communication device comprises a sidelink user equipment (UE), and wherein the initiating the registration protocol comprises initiating a sidelink discovery protocol.

Aspect 8. The method of aspect 7, wherein: the initiating the registration protocol comprises transmitting, to the sidelink UE, an indication of a repeater type of the first wireless communication device; and the method further comprises: receiving, from the sidelink UE, a sidelink capability report request based on the repeater type; and the transmitting the sidelink capability report is based on the sidelink capability report request.

Aspect 9. The method of any of aspects 7 or 8, wherein the sidelink capability report indicates at least one of: a sidelink synchronization signal block decoding capability; a sidelink channel decoding capability; a sidelink beam capability; a power class; a frequency granularity; a simultaneous sidelink and Uu communication capability; a channel sensing capability; or a repeater type index.

Aspect 10. The method of any of aspects 7-9, wherein the sidelink capability report is based on at least a Uu connection status of the first wireless communication device with a base station (BS).

Aspect 11. The method of any of aspects 7-11, wherein the transmitting the sidelink capability report is based on the sidelink UE being authorized by one or more higher layers of a protocol stack.

Aspect 12. The method of aspect 1, wherein the sidelink repeating configuration indicates one or more of: configured time resources for sidelink repeating; frequency resources associated with sidelink communications; frequency resources associated with Uu communications; receive beam directions; transmit beam directions; or transmit power.

Aspect 13. A method of wireless communication performed by a first wireless communication device, comprising: receiving, from a second wireless communication device, a connection request; receiving, from the second wireless communication device, a sidelink capability report indicating sidelink repeating capabilities of the second wireless communication device; and transmitting, based on the sidelink capability report, a sidelink repeating configuration.

Aspect 14. The method of aspect 13, wherein the sidelink capability report indicates at least one of: a sidelink synchronization signal block decoding capability; a sidelink channel decoding capability; a sidelink beam capability; a power class; a frequency granularity; a simultaneous sidelink and Uu communication capability; a channel sensing capability; or a repeater type index.

Aspect 15. The method of aspect 14, wherein the sidelink capability report indicates at least the sidelink channel decoding capability and the sidelink transmission capability, and wherein the sidelink channel decoding capability includes one or more of: a sidelink control channel decoding capability; a sidelink data channel decoding capability; a sidelink feedback channel decoding capability; a number of simultaneous decodings for one or more sidelink channels; or a number of simultaneous transmissions for one or more sidelink channels.

Aspect 16. The method of any of aspects 13-15, wherein: the first wireless communication device comprises a sidelink user equipment (UE); the method further comprises performing a sidelink discovery protocol; the sidelink discovery protocol comprises the receiving the connection request; the performing the sidelink discovery protocol comprises receiving, from the second wireless communication device, a signal indicating a repeater type of the second wireless communication device; and the method further comprises transmitting, to the second wireless communication device, a sidelink capability report request based on the repeater type.

Aspect 17. The method of any of aspects 13-16, wherein the sidelink repeating configuration indicates one or more of: configured time resources for sidelink repeating; frequency resources associated with sidelink communications; frequency resources associated with Uu communications; receive beam directions; transmit beam directions; or transmit power. Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Aspect 18. A first wireless communication device comprising a processor and a transceiver, wherein the processor and the transceiver are configured to perform the actions of any of aspects 1-12.

Aspect 19. A first wireless communication device comprising a processor and a transceiver, wherein the processor and the transceiver are configured to perform the actions of any of aspects 13-17.

Aspect 20. A non-transitory computer-readable medium having program code recorded thereon, wherein the program code comprises instructions executable by a processor to cause a first wireless communication device to: initiate a registration protocol for performing repeater operations for sidelink communications; transmit, to a second wireless communication device, a sidelink capability report indicating sidelink repeating capabilities of the first wireless communication device; receive a sidelink repeating configuration based on the sidelink capability report; and communicate a first signal based on the sidelink repeating configuration.

Aspect 21. A non-transitory computer-readable medium having program code recorded thereon, wherein the program code comprises instructions executable by a processor to cause a first wireless communication device to: receive, from a second wireless communication device, a connection request; receive, from the second wireless communication device, a sidelink capability report indicating sidelink repeating capabilities of the second wireless communication device; and transmit, based on the sidelink capability report, a sidelink repeating configuration.

Aspect 22. A first wireless communication device comprises means for performing the actions of any of claims 1-12.

Aspect 23. A first wireless communication device comprises means for performing the actions of any of claims 13-17.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a first wireless communication device, comprising:
    initiating a registration protocol for performing repeater operations for sidelink communications;
    transmitting, to a second wireless communication device, a sidelink capability report indicating sidelink repeating capabilities of the first wireless communication device, wherein the sidelink capability report indicates at least one of a decoding capability or a beam capability;
    receiving a sidelink repeating configuration based on the at least one of the decoding capability or the beam capability indicated by the sidelink capability report; and
    communicating a first signal based on the sidelink repeating configuration.

2. The method of claim 1, wherein the second wireless communication device comprises a base station (BS), and wherein the initiating the registration protocol comprises transmitting a registration request to the BS.

3. The method of claim 2, wherein the receiving the sidelink repeating configuration comprises receiving the sidelink repeating configuration from the BS.

4. The method of claim 2, wherein the receiving the sidelink repeating configuration comprises receiving the sidelink repeating configuration from a sidelink user equipment (UE).

5. The method of claim 2, wherein the sidelink capability report indicates at least one of:
    a sidelink synchronization signal block decoding capability;
    a sidelink channel decoding capability;
    a sidelink beam capability;
    a power class;
    a frequency granularity;
    a simultaneous sidelink and Uu communication capability;
    a channel sensing capability; or
    a repeater type index.

6. The method of claim 5, wherein the sidelink capability report indicates at least the sidelink channel decoding capability and a sidelink transmission capability, the sidelink channel decoding capability including one or more of:
- a sidelink control channel decoding capability;
- a sidelink data channel decoding capability;
- a sidelink feedback channel decoding capability;
- a number of simultaneous decodings for one or more sidelink channels; or
- a number of simultaneous transmissions for one or more sidelink channels.

7. The method of claim 1, wherein the second wireless communication device comprises a sidelink user equipment (UE), and wherein the initiating the registration protocol comprises initiating a sidelink discovery protocol.

8. The method of claim 7, wherein:
- the initiating the registration protocol comprises transmitting, to the sidelink UE, an indication of a repeater type of the first wireless communication device; and
- the method further comprises:
  - receiving, from the sidelink UE, a sidelink capability report request based on the repeater type; and
  - the transmitting the sidelink capability report is based on the sidelink capability report request.

9. The method of claim 7, wherein the sidelink capability report indicates at least one of:
- a sidelink synchronization signal block decoding capability;
- a sidelink channel decoding capability;
- a sidelink beam capability;
- a power class;
- a frequency granularity;
- a simultaneous sidelink and Uu communication capability;
- a channel sensing capability; or
- a repeater type index.

10. The method of claim 7, wherein the sidelink capability report is based on at least a Uu connection status of the first wireless communication device with a base station (BS).

11. The method of claim 7, wherein the transmitting the sidelink capability report is based on the sidelink UE being authorized by one or more higher layers of a protocol stack.

12. The method of claim 1, wherein the sidelink repeating configuration indicates one or more of:
- configured time resources for sidelink repeating;
- frequency resources associated with sidelink communications;
- frequency resources associated with Uu communications;
- receive beam directions;
- transmit beam directions; or
- transmit power.

13. A method of wireless communication performed by a first wireless communication device, comprising:
- receiving, from a second wireless communication device, a connection request;
- receiving, from the second wireless communication device, a sidelink capability report indicating sidelink repeating capabilities of the second wireless communication device, wherein the sidelink capability report indicates at least one of a decoding capability or a beam capability; and
- transmitting, based on the at least one of the decoding capability or the beam capability indicated by the sidelink capability report, a sidelink repeating configuration.

14. The method of claim 13, wherein the sidelink capability report indicates at least one of:
- a sidelink synchronization signal block decoding capability;
- a sidelink channel decoding capability;
- a sidelink beam capability;
- a power class;
- a frequency granularity;
- a simultaneous sidelink and Uu communication capability;
- a channel sensing capability; or
- a repeater type index.

15. The method of claim 14, wherein the sidelink capability report indicates at least the sidelink channel decoding capability and a sidelink transmission capability, and wherein the sidelink channel decoding capability includes one or more of:
- a sidelink control channel decoding capability;
- a sidelink data channel decoding capability;
- a sidelink feedback channel decoding capability;
- a number of simultaneous decodings for one or more sidelink channels; or
- a number of simultaneous transmissions for one or more sidelink channels.

16. The method of claim 13, wherein:
- the first wireless communication device comprises a sidelink user equipment (UE);
- the method further comprises performing a sidelink discovery protocol;
- the sidelink discovery protocol comprises the receiving the connection request;
- the performing the sidelink discovery protocol comprises receiving, from the second wireless communication device, a signal indicating a repeater type of the second wireless communication device; and
- the method further comprises transmitting, to the second wireless communication device, a sidelink capability report request based on the repeater type.

17. The method of claim 13, wherein the sidelink repeating configuration indicates one or more of:
- configured time resources for sidelink repeating;
- frequency resources associated with sidelink communications;
- frequency resources associated with Uu communications;
- receive beam directions;
- transmit beam directions; or
- transmit power.

18. A first wireless communication device, comprising:
- a processor and a transceiver in communication with the processor, wherein the processor and the transceiver are configured to:
  - initiate a registration protocol for performing repeater operations for sidelink communications;
  - transmit, to a second wireless communication device, a sidelink capability report indicating sidelink repeating capabilities of the first wireless communication device, wherein the sidelink capability report indicates at least one of a decoding capability or a beam capability;
  - receive a sidelink repeating configuration based on the at least one of the decoding capability or the beam capability indicated by the sidelink capability report; and
  - communicate a first signal based on the sidelink repeating configuration.

19. The first wireless communication device of claim 18, wherein the second wireless communication device comprises a base station (BS), and wherein the processor and the transceiver configured to initiate the registration protocol comprises the processor and the transceiver configured to transmit a registration request to the BS.

20. The first wireless communication device of claim 19, wherein the processor and the transceiver configured to receive the sidelink repeating configuration comprises the processor and the transceiver configured to receive the sidelink repeating configuration from the BS.

21. The first wireless communication device of claim 19, wherein the processor and the transceiver configured to receive the sidelink repeating configuration comprises the processor and the transceiver configured to receive the sidelink repeating configuration from a sidelink user equipment (UE).

22. The first wireless communication device of claim 19, wherein the sidelink capability report indicates at least one of:
   a sidelink synchronization signal block decoding capability;
   a sidelink channel decoding capability;
   a sidelink beam capability;
   a power class;
   a frequency granularity;
   a simultaneous sidelink and Uu communication capability;
   a channel sensing capability; or
   a repeater type index.

23. The first wireless communication device of claim 22, wherein the sidelink capability report indicates at least the sidelink channel decoding capability and a sidelink transmission capability, the sidelink channel decoding capability including one or more of:
   a sidelink control channel decoding capability;
   a sidelink data channel decoding capability;
   a sidelink feedback channel decoding capability;
   a number of simultaneous decodings for one or more sidelink channels; or
   a number of simultaneous transmissions for one or more sidelink channels.

24. The first wireless communication device of claim 18, wherein the second wireless communication device comprises a sidelink user equipment (UE), and wherein the processor and the transceiver configured to initiate the registration protocol comprises the processor and the transceiver configured to initiate a sidelink discovery protocol.

25. The first wireless communication device of claim 24, wherein:
   the processor and the transceiver configured to initiate the registration protocol comprises the processor and the transceiver configured to transmit, to the sidelink UE, an indication of a repeater type of the first wireless communication device;
   the processor and the transceiver are further configured to:
      receive, from the sidelink UE, a sidelink capability report request based on the repeater type; and
      the processor and the transceiver configured to transmit the sidelink capability report based on the sidelink capability report request.

26. The first wireless communication device of claim 24, wherein the sidelink capability report indicates at least one of:
   a sidelink synchronization signal block decoding capability;
   a sidelink channel decoding capability;
   a sidelink beam capability;
   a power class;
   a frequency granularity;
   a simultaneous sidelink and Uu communication capability;
   a channel sensing capability; or
   a repeater type index.

27. The first wireless communication device of claim 24, wherein the sidelink capability report is based on at least a Uu connection status of the first wireless communication device with a base station (BS).

28. The first wireless communication device of claim 24, wherein the processor and the transceiver are configured to transmit the sidelink capability report based on the sidelink UE being authorized by one or more higher layers of a protocol stack.

29. The first wireless communication device of claim 18, wherein the sidelink repeating configuration indicates one or more of:
   configured time resources for sidelink repeating;
   frequency resources associated with sidelink communications;
   frequency resources associated with Uu communications;
   receive beam directions;
   transmit beam directions; or
   transmit power.

30. A first wireless communication device, comprising:
   a processor and a transceiver in communication with the processor, wherein the processor and the transceiver are configured to:
      receive, from a second wireless communication device, a connection request;
      receive, from the second wireless communication device, a sidelink capability report indicating sidelink repeating capabilities of the second wireless communication device, wherein the sidelink capability report indicates at least one of a decoding capability or a beam capability; and
      transmit, based on the at least one of the decoding capability or the beam capability indicated by the sidelink capability report, a sidelink repeating configuration.

* * * * *